(12) United States Patent
Ohishi et al.

(10) Patent No.: US 6,614,994 B2
(45) Date of Patent: Sep. 2, 2003

(54) SHAKE DETECTION DEVICE, OPTICAL DEVICE, CAMERA SYSTEM, AND INTERCHANGEABLE LENS

(75) Inventors: Sueyuki Ohishi, Tokyo (JP); Tomita Hiroyuki, Kawasaki (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 09/917,901

(22) Filed: Jul. 31, 2001

(65) Prior Publication Data

US 2002/0015587 A1 Feb. 7, 2002

(30) Foreign Application Priority Data

Aug. 2, 2000 (JP) ........................... 2000-233831
Aug. 8, 2000 (JP) ........................... 2000-239531

(51) Int. Cl.[7] .................................................. G03B 5/00
(52) U.S. Cl. ........................................................... 396/55
(58) Field of Search ....................................... 396/52–55

(56) References Cited

U.S. PATENT DOCUMENTS

| | | | | |
|---|---|---|---|---|
| 5,615,397 A | * | 3/1997 | Shiomi et al. | 396/55 |
| 6,035,134 A | * | 3/2000 | Sato et al. | 396/55 |
| 6,097,895 A | * | 8/2000 | Furuyama | 396/55 |
| 6,272,289 B1 | * | 8/2001 | Washisu | 396/55 |

FOREIGN PATENT DOCUMENTS

| | | | | |
|---|---|---|---|---|
| JP | 2000-122106 | | 4/2000 | G03B/5/00 |
| JP | 2000-330152 | | 11/2000 | G03B/5/00 |

* cited by examiner

Primary Examiner—W. B. Perkey

(57) ABSTRACT

There is provided a shake detection mechanism in which a determination portion for determining the supporting or fixation condition of a device including the shake detection mechanism is built. The determination portion separately performs detection of a stably supported condition and detection of a non-stably supported condition. The determination portion stops determining the fixation condition when the device is presumably vibrating.

43 Claims, 17 Drawing Sheets

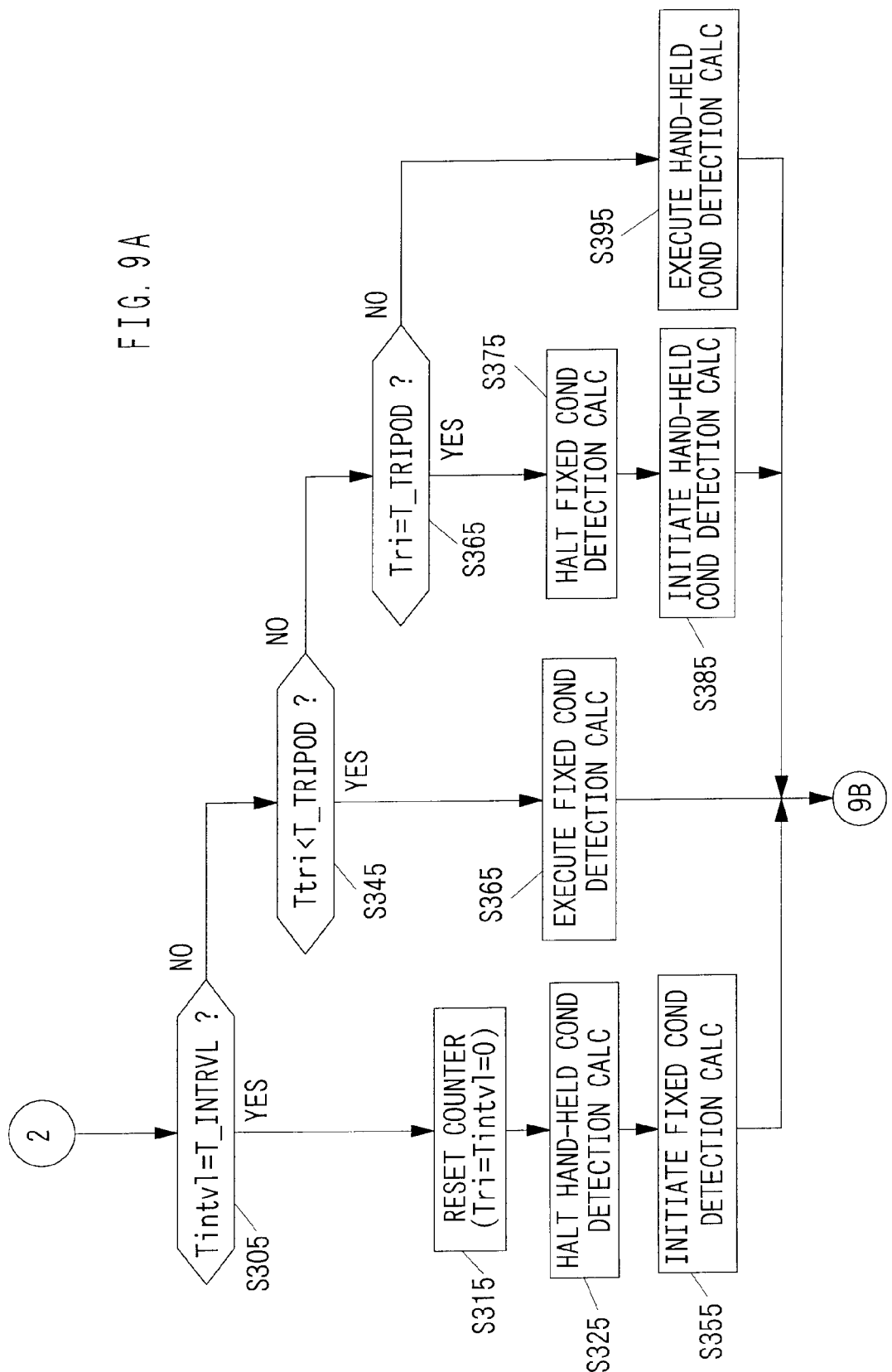

SHAKE DETECTION DEVICE, OPTICAL DEVICE, CAMERA SYSTEM, AND INTERCHANGEABLE LENS

INCORPORATION BY REFERENCE

The disclosure of the following priority applications are incorporated herein by reference: Japanese Patent Applications, No. 2000-233831 filed on Aug. 2, 2000 and No. 2000-239531 filed on Aug. 8, 2000.

FIELD OF THE INVENTION

The present invention relates to a shake detection device that detects vibration due to a shake or the like in an optical device such as binoculars and in a shooting device such as a camera and relates to an optical device, a camera system, and a interchangeable lens in each of which the shake detection device is built.

BACKGROUND OF THE INVENTION

FIG. 12 is a block diagram illustrating a basic configuration of a blur correction device including a shake detection device. Referring to the Figure, the mechanism of the blur correction device will be described.

Angular velocity sensor 10 is a sensor that first detects a shake to which a camera is subjected. Typically, angular velocity sensor 10 is implemented utilizing a piezoelectric oscillation-type angular velocity sensor that detects Coriolis force. An output from angular velocity sensor 10 is transmitted to reference value calculator 52. Reference value calculator 52 is a unit that calculates a reference shake value using the output from angular velocity sensor 10. Thereafter, the reference shake value is subtracted from a shake signal from angular velocity sensor 10, and then the remainder is transmitted to integrator 54. Integrator 54 is a unit that time-integrates a shake signal expressed in the angular velocity unit to convert it into a shake angle of a camera.

Target drive position calculator 56 calculates target drive position information for driving blur correction lens 80, by adding information such as the focal length of the camera lens to the shake angle information sent from integrator 54.

Drive signal calculator 58, in order to move blur correction lens 80 in response to the target drive position information sent from target drive position calculator 56, calculates a differential between the target drive position information and the present position information of blur correction lens 80 and then supplies a drive current to coil 73.

Actuator 70 is provided to move blur correction lens 80 and is constituted of yoke 71, magnet 72, coil 73, etc. Coil 73 is positioned within a magnetic circuit formed by yoke 71 and magnet 72, and thus when an electric current is supplied to coil 73, a force is generated in actuator 70 in accordance with the Fleming's left-hand rule.

As shown in FIG. 12, coil 73 is attached to lens barrel 82, which accommodates blur correction lens 80. Because blur correction lens 80 and lens barrel 82 are configured so that they can move perpendicularly to the optical axis I, blur correction lens 80 can be driven perpendicularly to the optical axis I by supplying an electric current to coil 73.

Optical position detector 74 is provided to monitor the movement of blur correction lens 80 and is constituted of infrared ray emitting diode (hereinafter, IRED) 75, slit plate 76, slit 76A, PSD (position sensitive device) 77, etc. A light ray from IRED 75 first passes through slit 76A with the width of the light ray being thus diminished and then reaches PSD 77. PSD 77 is a device that outputs a signal indicative of a light position on its light-receiving surface.

Because slit plate 76 is attached to lens barrel 82 as shown in FIG. 12, the movement of blur correction lens 80 provides the movement of slit 76A, inducing thus the movement of the light ray on the light-receiving surface of PSD 77. Therefore, the position of the light ray on the light-receiving surface of PSD 77 is equivalent to the position of blur correction lens 80. A signal detected by PSD 77 is fed back as position signal 78.

Such a blur correction device is built mainly in a shooting device such as a camera and in an optical device such as binoculars. When those devices are used while being held with a user's hands, the blur correction device effectively works for correcting image blurring due to a shake from the user. However, the blur correction device need not be operated when the optical devices are fixed, e.g., when they are fixed on a tripod or the like.

The reason why the blur correction device need not be operated in such a situation is that if it is operated, higher power consumption results, the blur correction device unnecessarily operates because of, e.g., noise in the output of the angular velocity sensor, and the image is blurred all the more.

To address those problems, some methods have been proposed to determine whether an optical device with a blur correction device is fixed on a tripod or the like or is held with hands. For example, in Japanese Laid-open Patent Application Hei Nos. 9-304802 and 5-53168 are disclosed methods wherein whether or not the device is fixed is determined by providing a switch on the device's portion to which a tripod is to be attached.

Also in Japanese Laid-open Patent Application Hei Nos. 10-161172, 11-38461, and 11-64911 are disclosed methods wherein whether or not the device is fixed is determined based on the level or the frequency of the output from the shake detection sensor.

In each category of the patent applications above, when it is determined that the device is fixed on a tripod, a process follows in which blur correction is stopped or the blur correction control is more suppressed than when the device is held with hands.

The above-described prior art determination methods, however, may cause the following problems.

In the case of the first category methods, i.e., where a switch is provided on the device is portion to which a tripod is to be attached, because the switch equally turns to be on either when a tripod is attached to the device or when a unipod is attached to the device, it cannot be identified which of the two is attached.

In other words, attaching a unipod may simply results in recognition of the device being attached with a tripod. When a camera is used being mounted on a unipod, the camera still vibrates due to a shake, although the vibration is decreased a little more than when the camera is supported solely with hands. Thus, blur correction should preferably be done when a camera is mounted on a unipod.

But the first category methods cannot distinguish a tripod from a unipod, and thus being attached with a unipod is recognized as being attached with a tripod, which results in stopping or suppressing the blur correction. Attaching a unipod, therefore, would be susceptible to image blurring.

Moreover, when, not using a tripod or the like, a camera is fixed with the camera being mounted on a base, the methods cannot determine the supporting condition, and thus blur correction is performed even if the camera itself is not vibrating, which results in losing valuable power or in image blurring all the more.

In the case of the second category methods, wherein determination is made by monitoring outputs (amplitude, frequency, etc.) from the shake detection sensor, it may be determined whether the camera is attached to a unipod or to a tripod, through some ingenuities applied to the methods. However, such methods may err in the determination if the sensor is subjected to certain large disturbances.

Illustratively, when the blur correction device is started while the camera is kept in a state of being fixed on a tripod, the device determines that the camera is fixed on the tripod. Notably, however, operations such as a mirror flipping up and down operation, a shutter curtain running operation, and a motor driving operation, which produce vibration of the camera itself, are performed during the camera's shooting operation. Because the shake detection sensor then also detects the vibration, it is well conceivable that the output amplitude of the shake detection sensor becomes larger during the shooting operation. Thus, even when the camera is fixed on a tripod, it is determined that the camera is held with hands because of the vibration generated during the shooting operation, and the blur correction operation will be initiated. Even in this case, if the output from the shake detection sensor is stable (i.e., not drifting), it is not so problematic; however, if unstable (drifting), the quality of a resultant picture deteriorates.

As described above, with the method wherein a switch is provided on the camera's portion to which a tripod is to be attached, a tripod cannot be distinguished from a unipod; and with the method wherein the outputs of the shake detection sensor are used, erroneous determination results from the camera's internal vibration.

Additionally, the following problems may arise.

(a) In the case of determining the supporting condition based only on the frequency or level of the sensor's outputs, if the shake happens to come to be small while the camera is held with hands, then it may be erroneously determined that the camera is fixed on a tripod. Because an optical device with a built-in blur correction function is considered, by its nature, to be generally used being held with hands, frequent occurrence of such determination is undesirable.

(b) Apropos, the output of an angular velocity sensor includes drift components (i.e., although the sensor is completely stationary, the output varies). For this reason, when the blur correction device is started with the camera being fixed on a tripod or the like, the blur correction lens unnecessarily moves because of the drift components, and the resultant image may deteriorate all the more. Such drift increases especially immediately after power is supplied to the sensor; accordingly, if the camera is fixed on a tripod or the like, it should be promptly recognized that the camera is so fixed. However, when the supporting condition is determined based on the frequency or level of the sensor's outputs, a certain amount of time is inevitably required before determining the condition because the frequencies of a shake from a user range mainly from 3 to 5 Hz.

(c) Even when the camera is fixed on a tripod, the camera may be panned to adjust the composition. In that case, although determining during the panning that the camera is held with hands is acceptable, the determination should be returned, on completion of the panning, to the determination indicating that the camera is fixed. However, if the determination is made to return too easily, the situation described in (a) above, wherein although the camera is held with hands, it is erroneously determined that the camera is fixed, may occur more frequently.

SUMMARY OF THE INVENTION

Therefore, there have been the following needs: to realize both precise shake detection and power savings without being affected by the fixation method differences and internal vibrations; and to, by effectively determining whether the optical or shooting device is fixed or is held with hands, realize shake detection and/or blur correction that do not irritate the user whether the device is held with hands or is mounted on a tripod.

According to the present invention, in order to address those needs, when an optical or shooting device including the shake detection device performs an operation that generates vibration of the optical or shooting device itself, the determination of the fixation condition is halted even when the shake is being detected. Further, the shake detection device stores the determination result of the fixation condition at the time when the fixation condition determination halt was initiated. Further, assuming that the optical or shooting device including the shake detection device is a camera, there are, as the operation that generates vibration of the camera itself, operations such as the film winding operation, the shutter operation, and the mirror driving operation; and, when at least one of those operation is performed, the determination of the fixation condition is halted.

According to another aspect of the present invention, as a supporting condition determination portion (fixation condition determination portion) for determining whether the device is in a state of stably supported condition (fixed) or is in a state of non-stably supported condition (held with hands), a stable support condition detection portion and a non-stable support condition detection portion are separately provided. Further, with the supporting condition determination portion, stable support condition detecting and non-stable support condition detecting are performed alternately and successively.

Still further, the stable support condition detection time duration is made smaller than the non-stable support condition detection time duration. In addition, by regarding the initial stage of the vibration detection as in a stabilized state in consideration of the unstableness of the stage, false detection of the initial stage of the vibration detection as in a non-stabilized state can be avoided.

BRIEF DESCRIPTION OF THE DRAWINGS

FIGS. 9A and 9B are flowcharts illustrating a flow of calculations performed in supporting condition determination portion 40 of the blur correction camera according to the second embodiment.

Figure 1:
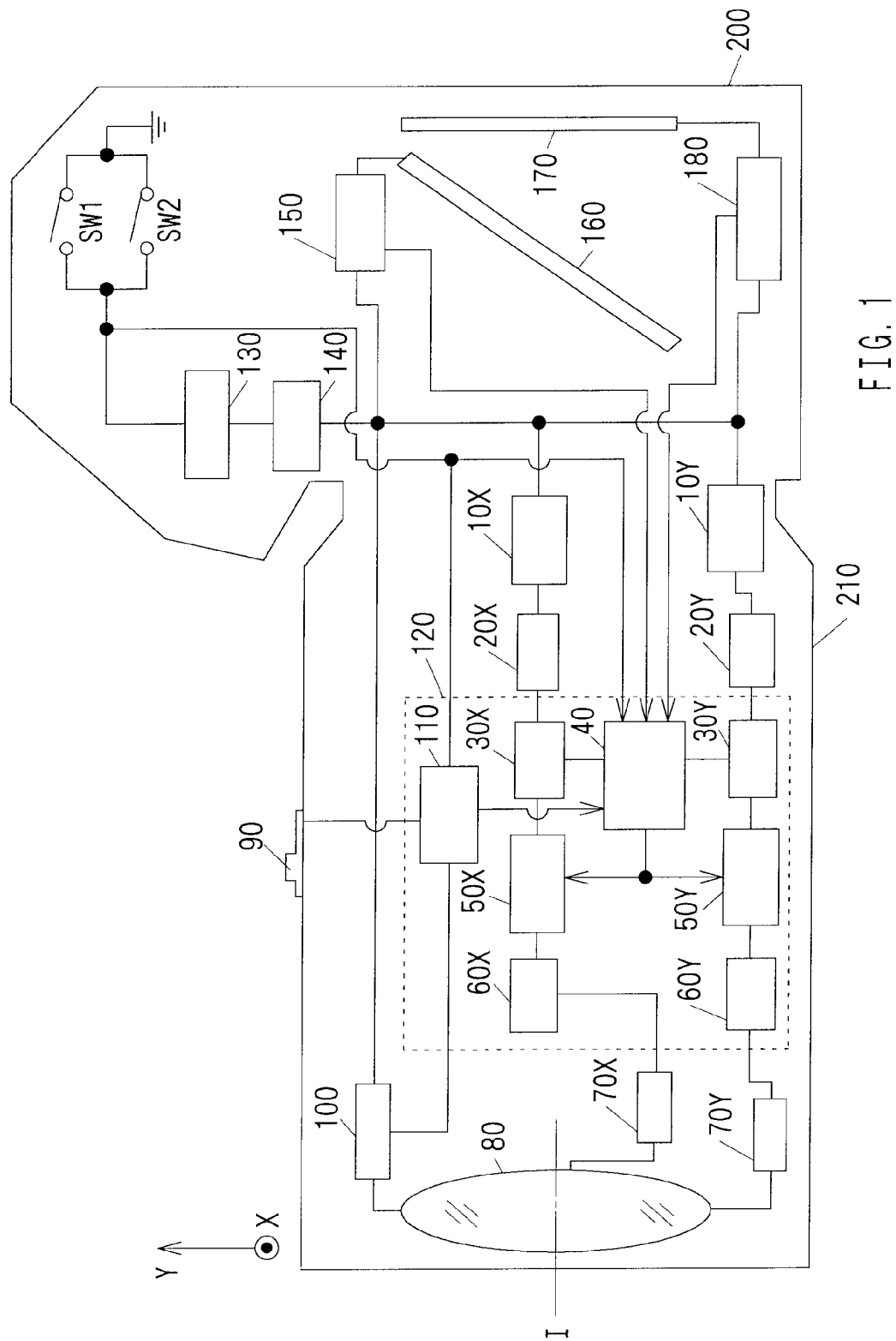
FIG. 1 is a block diagram that outlines an embodiment of a shake detection device and a blur correction optical device according to the present invention.

DETAILED DESCRIPTION OF THE PREFERRED EMBODIMENTS (First Embodiment)

Referring to the drawings illustrating the embodiments of the present invention, the invention will now be described in more detail.

FIG. 1 is a block diagram that outlines an embodiment of a shake detection device and a blur correction optical device according to the present invention.

Angular velocity sensor 10 is a sensor that detects in angular velocity unit a vibration applied to a camera is subjected. Angular velocity sensor 10 detects an angular velocity through Coriolis force and outputs the detection result as a voltage signal. Angular velocity sensor 10X detects an angular shake in the X-direction of the drawing, and angular velocity sensor 10y detects an angular shake in the Y-direction. Angular velocity sensors 10X and 10Y can thus two-dimensionally detect the vibration of the camera. The voltage signals outputted from angular velocity sensor 10 are transmitted to amplifier 20. Angular velocity sensor 10 can detect the angular velocity only when power is supplied to the sensor from power supply 140 described below.

Although in FIG. 1 circuits associated with the X-direction are designated with the letter X being added and circuits associated with the Y-direction are designated with the lettr Y being added, if a similar process is performed in a pair of the dual circuits, redundant description will be omitted by omitting the letters hereinafter.

Amplifier 20 amplifies the output from angular velocity sensor 10. Because the level of the output from angular velocity sensor 10 is generally small, processing in a microprocessor the output as it is after digitizing it by A/D converter 30 would not provide a sufficient accuracy of vibration detection because the value range of the angular velocity is too small (i.e., the angular velocity value per bit is too large) and thus would not provide a sufficient accuracy of blur correction. To address this problem, the angular velocity signal is amplified before being inputted into A/D converter 30, and thus the amplified signal can be processed in the microprocessor with higher resolution and the blur correction accuracy can be enhanced.

Amplifiers 20X and 20Y correspond to angular velocity sensors 10X and 10Y, respectively. Amplifier 20 may, in addition to the amplification function, include a low-pass filter function for cutting off the high-frequency components of the sensor output. The angular velocity signal (hereinafter, shake detection signal) amplified by amplifier 20 is transmitted to A/D converter 30.

A/D converter 30 is provided to convert the analog shake detection signal sent from amplifier 20 into a digital signal. Converting the shake detection signal into a digital signal permits microprocessor 120 to arithmetically process the signal. Although an A/D converter built in microprocessor 120 is assumed to work as A/D converter 30, an external A/D converter may be alternatively used.

In FIG. 1, a pair of A/D converters 30X and 30Y are provided so that A/D converter 30X corresponds to amplifier 20X and A/D converter 30Y corresponds to amplifier 20Y. However, by integrating the pair of A/D converters into a single converter, it may be so configured that the single A/D converter works on a "divisional-time" basis. For example, the single A/D converter converts a signal from amplifier 20X and next converts a signal from amplifier 20Y; and then executes the same sequence repeatedly.

Supporting condition determination portion (fixation condition determination portion) 40 determines the supporting condition of the camera based on the shake detection signal converted into a digital signal by A/D converters 30X and 30Y. Specifically, it determines whether the camera is fixed on some fixing means such as a tripod (hereinafter, fixed condition [stably supported condition]) or is held with a user's hands (hereinafter, hand-held condition [non-stably supported condition]). The determination result is transmitted to drive signal calculator 50. The supporting condition determination operation and the output operation of the determination result are continued as long as the shake detection signal is inputted into supporting condition determination portion 40, i.e., as long as power is supplied to angular velocity sensor 10.

Additionally, supporting condition determination portion 40 either continues or halts the determination calculation of the fixation condition, in response to the states of electromagnetic lock controller 110, film winding motor 180, shutter mechanism 190, mirror drive motor 150, half-press switch SW1, and full-press switch SW2. When supporting condition determination portion 40 halts the determination calculation, the determination result just before the determination calculation halt is maintained in the portion 40. The determination result is transmitted to drive signal calculator 50. Supporting condition determination portion 40 will be described later in detail referring to FIG. 2.

Drive signal calculator 50 calculates a drive signal for driving blur correction lens 80 based on the shake detection signal transmitted from A/D converter 30 and then outputs the drive signal. Drive signal calculator 50 first calculates a reference value using the shake detection signal and then the reference value from the shake detection signal value. Drive signal calculator 50, by integrating the remainder, converts the angular velocity signal of the shake detection signal into an angular displacement signal and further into a drive signal for driving blur correction lens 80. Drive signal calculator 50 calculates the drive signal, based on, e.g., the following formula:

$$\theta(t)=\theta(t-1)+C\cdot[\omega(t)-\omega 0(t)]\cdot\alpha \tag{1}$$

where $\theta(t)$ is the drive signal; $\omega(t)$ is the shake detection signal; $\omega 0(t)$ is the reference value; t is time; and C is a constant defined by the focal length condition and the like.

Further, α in the formula (1) is a variable of which value depends on the determination result sent from supporting condition determination portion (fixation condition determination portion) 40 and is given with the following values depending on whether the camera is held with hands or is fixed: If in a hand-held condition, then $\alpha=1$; and If in a fixed condition, then $\alpha=0$.

Given so, when the camera is held with hands, blur correction lens 80 will be driven based on the shake information detected by angular velocity sensor 10. In other words, a shake from a user will be corrected. In contrast, when the camera is fixed, blur correction lens 80 will stop because the drive signal is held at a constant value. Additionally, if the value of $\alpha$ in a fixed condition is set to be "$0<\alpha<1$", a more suppressed blur correction drive will be realized than when the camera is determined as being held with hands.

The calculated drive signal is transmitted to D/A converter 60. It is to be noted that even when it is determined that the camera is fixed, drive signal calculator 50 continues to calculate the reference value and the drive signal. This continuous calculation process is intended to assure that when the determination indicating the fixed condition changes to that indicating a hand-held condition, a blur correction operation step can be promptly started.

In FIG. 1, a pair of drive signal calculators 50X and 50Y are provided so that drive signal calculator 50X corresponds to A/D converter 30X and drive signal calculator 50Y corresponds to A/D converter 30Y. However, by integrating the pair of drive signal calculators into a single signal calculator, it may be so configured that the single signal calculator works on a "divisional-time" basis. For example, the single signal calculator calculates a drive signal based on a signal from A/D converter 30X and next calculates a drive signal based on a signal from A/D converter 30Y; and then executes the same sequence repeatedly.

D/A converter 60 is provided to convert the drive signal (digital signal) calculated by drive signal calculator 50 into an analog signal. The converted analog signal is transmitted to driver portion 70.

Although in FIG. 1 a D/A converter built in microprocessor 120 provided in the lens portion is assumed to work as D/A converter 60, an external D/A converter may be alternatively used.

In FIG. 1, a pair of D/A converters 60X and 60Y are provided so that D/A converter 60X corresponds to drive signal calculator 50X and D/A converter 60Y corresponds to drive signal calculator 50Y. However, by integrating the pair of D/A converters into a single D/A converter, it may be so configured that the single D/A converter works on a "divisional-time" basis. For example, the single D/A converter converts a signal from drive signal calculator 50X and next converts a signal from drive signal calculator 50Y; and then executes the same sequence repeatedly.

Driver portion 70 is provided in the lens portion and drives blur correction lens 80 based on the drive signal (analog signal) transmitted from D/A converter 60. Driver portion 70 includes actuators for driving blur correction lens 80, position detection sensors for detecting the position of correction lens 80, etc.

Because blur correction lens 80 is to be driven two-dimensionally, driver portion 70 is constituted of two driver portions as shown in FIG. 1.

Blur correction lens 80 is a single lens or a lens group constituted of a plurality of lenses accommodated in the imaging optical system of the shooting device and is movable in a plane substantially perpendicular to the optical axis of the imaging optical system. Blur correction lens 80 is driven in the directions substantially perpendicular to the optical axis by drive portion 70 and deflects the optical axis, I.

Image blurring of a photograph, etc. occurs when an image on an image plane (e.g., on the film surface) moves during exposure due to a vibration, such as a shake, applied to a camera. But, a vibration detection sensor such as angular velocity sensor 10 is built in a blur correction camera as shown in FIG. 1, so that the vibration applied to the camera can be detected by the vibration detection sensor. When the vibration applied to the camera is detected, the movement of the image on the image plane due the vibration can be estimated; and thus, by driving blur correction lens 80 so that the image on the image plane does not move, the movement of the image, i.e., the image blurring can be corrected.

Blur correction mode setting switch 90 is provided for the user to set the blur correction operation mode of blur correction. The user can selectively set a blur correction operation mode from among the following three blur correction operation modes. The type of the blur correction operation mode selected by the user is transmitted to electromagnetic lock controller 110.

(1) "Blur correction OFF mode" is a mode wherein no blur correction is performed under whatever manner the user operates the camera.

(2) "Blur correction mode 1" is a mode wherein blur correction is performed while half-press timer 130 is ON. In addition, under this mode, even when half-press switch SW1 is OFF, the blur correction is continued for a predetermined time until electromagnetic lock 100 locks blur correction lens 80.

(3) "Blur correction mode 2" is a mode wherein blur correction is performed only during exposure. Under this mode, the blur correction is not performed even when half-press switch SW1 or half-press timer 130 is ON.

The set condition of blur correction mode setting switch 90 is transmitted to electromagnetic lock controller 110.

Electromagnetic lock 100 is a lock mechanism for fixing blur correction lens 80 in a predetermined position. As long as electromagnetic lock 100 locks blur correction lens 80, driver portion 70 does not drive blur correction lens 80.

Electromagnetic lock controller 110 controls electromagnetic lock 100 in accordance with the set condition of blur correction mode setting switch 90 as follows:

(1) Under the blur correction OFF mode, blur correction lens 80 is always locked. Under whatever manner the user operates the camera, the lock will not be released.

(2) Under blur correction mode 1, the lock of blur correction lens 80 is released just when half-press switch SW1, and thus half-press timer 130, is turned to be ON. As long as half-press switch SW1 is ON, the lock release state is maintained. When half-press switch SW1 is turned to be OFF, the release state is maintained for a predetermined time after half-press switch SW1 being turned to OFF, and blur correction lens 80 will be locked after the lapse of the predetermined time.

(3) Under blur correction mode 2, the lock of blur correction lens 80 is released substantially at the same time as full-press switch SW2 is turned to be ON. The release state is maintained during the shooting operations such as a mirror flipping up operation, a shutter curtain running operation, a mirror flipping down operation, and a motor driving operation; and blur correction lens 80 will be locked substantially at the same time as the shooting operations end.

Microprocessor 120 includes the above-described calculators, controllers, and converters designated by numerals 30–60 and 110. Microprocessor 120 may also control an auto-focus drive, although not specifically illustrated.

Although, in the Figure, all of the calculators, controllers, and converters designated by numerals 30–60 and 110 are assumed to be built in microprocessor 120, they may be provided separately.

Half-press timer 130 is a timer that turns to be ON at the same time as half-press switch SW1 turns to be ON. Half-press timer 130 is maintained to be ON as long as half-press switch SW1 is being pushed and is further maintained to be ON for a predetermined time even after half-press switch SW1 turns to be OFF.

Power supply 140 continues to supply power to all portions in the camera system that require power, among others, to angular velocity sensor 10, as long as the camera's half-press switch SW1 is ON. When half-press switch SW1 is OFF, power supply is stopped. Accordingly, only when the camera's half-press switch SW1 is ON, the detection of the camera's vibration through angular velocity sensor 10 can be effected.

Mirror drive motor 150, being supplied with power from power supply 140, flips up and down mirror 160 as necessary. The driving state of mirror drive motor 150 is transmitted to supporting condition determination portion (fixation condition determination portion) 40. Provided that it is so configured that the information on the mirror's flipping up/down is transmitted to supporting condition determination portion (fixation condition determination portion) 40, a mechanical means such as a spring may be utilized instead of an electromagnetic actuator such as a motor.

Mirror 160 reflects light passed through the camera lens (including blur correction lens 80) and direct the light to an unillustrated pentagonal prism and to an unillustrated finder. During the exposure operation, mirror 160 is flipped up and thus the light from the camera lens reaches the surface of film 170.

Film 170 is a silver halide film for recording a subject image imaged via blur correction lens 80. The camera in the embodiment is assumed to be a "silver halide camera"; however, a camera accommodating an area sensor such as a CCD or C-MOS sensor may be used instead.

Film winding motor 180 is a motor for winding up the film frame by frame after an exposure operation. The driving state of film winding motor 180 is transmitted to fixation condition determination portion 40.

In the case of using as the recording medium an area sensor such as a CCD sensor, film winding motor 180 can be dispensed with.

Shutter mechanism 190 is a mechanism for controlling the light amount of the imaged subject image.

Numeral 200 designates the camera body of the camera; numeral 210 designates the lens barrel of the camera. The camera may be either an interchangeable lens type camera such as a single-lens reflex one or a non-interchangeable lens type camera such as a compact one. In the case of applying the present invention to a single-lens reflex camera system, by providing blur correction lens 80, angular velocity sensor 10, microprocessor 120, driver portion 70, electromagnetic lock 100, etc. to lens barrel 120, a camera system of which camera body has not an angular velocity sensor and the like can be realized.

Half-press switch SW1 is a switch that turns to be ON in synchronization with a half-press operation of an unillustrated release button. With half-press switch SW1 turning to be ON, metering calculation by an unillustrated metering portion, an auto-focus drive, etc. are initiated. Further, If half-press timer 130 is OFF, it turns to be ON at the same time as half-press switch SW1 turns to be ON.

Full-press switch SW2 is a switch that turns to be ON in synchronization with a full-press operation of the release button. With switch SW2 turning to be ON, a sequential shooting operation including the flipping up operation of mirror 160, the shutter's open and close operations through shutter mechanism 190 (see FIG. 2), the flipping down operation of mirror 160, the winding operation of film 170 through film winding motor 180, etc. is performed.

Figure 2:
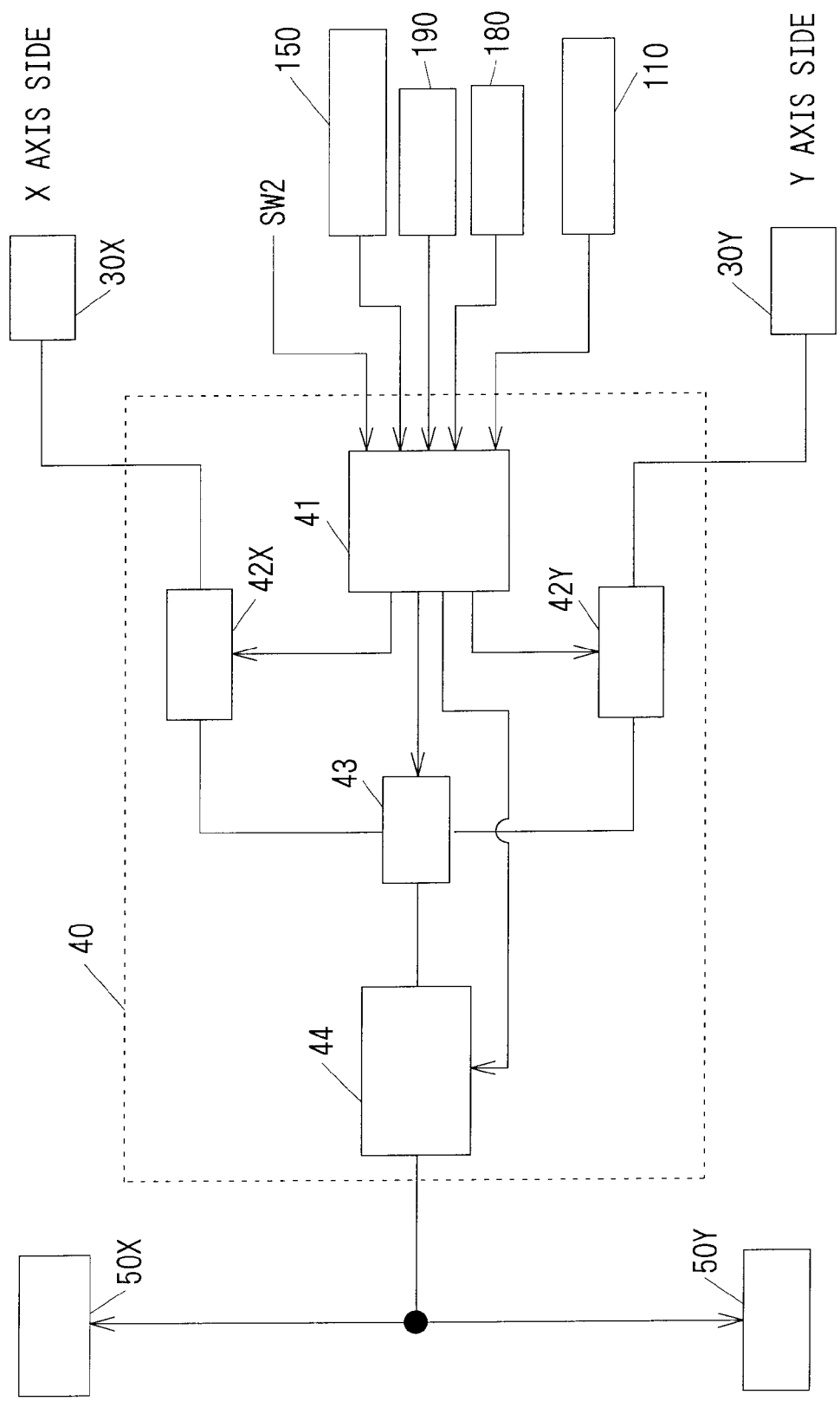
FIG. 2 illustrates an inner configuration of fixation condition determination portion 40 of a first embodiment.

FIG. 2 illustrates an inner configuration of fixation condition determination portion 40.

Halt command portion 41, by referring to the operation states of electromagnetic lock controller 110, full-press switch SW2, mirror drive motor 150, film winding motor 180, and shutter mechanism 190, transmits as necessary a halt command on the fixation condition determination operation to signal determination portions 42X and 42Y, logical multiplication portion 43, and determination result holding portion 44. More specifically, the determination operation is performed as follows:

(1) Under blur correction mode 1, while angular velocity sensor 10 is ON and full-press switch SW2 is OFF, a halt command is not delivered and the fixation condition determination operation is continued. When full-press switch SW2 turns to be ON, halt command portion 41 transmits a halt command to signal determination portion 42, logical multiplication portion 43, and determination result holding portion 44. On receipt of the halt command, signal determination portion 42 and logical multiplication portion 43 stop their operations. Determination result holding portion 44 holds the fixation condition determination result at the time point when it received the halt command and then transmits the held result to drive signal calculators 50.

While after full-press switch SW2 turns to be ON, the sequential shooting operation including the mirror flipping up operation, the exposure operation, the mirror flipping down operation, and the film winding operation is performed, halt command portion 41 continues to deliver the halt command during the sequential shooting operation. Determination result holding portion 44 continues to output the held result to drive signal calculators 50 as long as the halt command is transmitted.

At the time point when film winding motor 180 stops and thus the shooting operation is completed, halt command portion 41 stops transmitting the halt command and reinitiates the fixation condition determination operation.

(2) Under blur correction mode 2, while angular velocity sensor 10 is ON and full-press switch SW2 is OFF, a halt command is not delivered and the fixation condition determination operation is continued. When full-press switch SW2 turns to be ON, halt command portion 41 transmits a halt command to signal determination portion 42, logical multiplication portion 43, and determination result holding portion 44. The operations followed by signal determination portion 42, logical multiplication portion 43, and determination result holding portion 44 when the halt command is transmitted are the same as those under blur correction mode 1.

While after full-press switch SW2 turns to be ON, the sequential shooting operation including the electromagnetic lock releasing operation, the mirror flipping up operation, the exposure operation such as the shutter open and close operations, the mirror flipping down operation, the film winding operation, and the electromagnetic lock operation is performed, halt command portion 41 continues to deliver the halt command during the sequential shooting operation. Determination result holding portion 44, in the same manner as under blur correction mode 1, continues to output the held result to drive signal calculators 50 as long as the halt command is transmitted.

At the time point when blur correction lens 80 is locked by electromagnetic lock 100 and the shooting operation is completed, halt command portion 41 stops transmitting the halt command and reinitiates the fixation condition determination operation.

Signal determination portion 42 performs a calculation for determining whether the camera is held with hands or is fixed based on the shake detection signal (digital signal) sent from A/D converter 30 and then actually determines whether the camera is held with hands or is fixed based on the calculation result. With respect to how to process the shake detection signal, there can be listed several kinds of such processes, e.g., monitoring the level or the frequency of the signal; but here, any one of the processes may be utilized.

Signal determination portions 42X and 42Y are separately dedicated to the X-axis and the Y-axis, respectively, and outputs their respective determination results to logical multiplication portion 43.

Logical multiplication portion 43 performs the final fixation condition determination based on the two fixation condition determination results sent from signal determination portions 42X and 42Y. Logical multiplication portion 43 determines the final fixation condition by taking the two results into consideration in a sense of a logical multiplication. More specifically, the final fixation condition is determined as follows:

(1) If a "hand-held condition" holds with respect to both of the X-axis and the Y-axis, then the final fixation condition is determined to be a "hand-held condition."

(2) If a "hand-held condition" holds with respect to either the X-axis or the Y-axis, then the final fixation condition is determined to be a "hand-held condition."

(3) If a "fixed condition" holds with respect to both of the X-axis and the Y-axis, then the final fixation condition is determined to be a "fixed condition."

When the camera is fixed on a stable base such as a tripod, the level of the shake detection signal is generally small in both the X-axis and the Y-axis. However, when the camera is fixed on a unipod, although the level of the shake detection signal in one of the axes will be reduced, the level of the shake detection signal in the other axis will not be reduced so much. (For example, when the camera is fixed horizontally on the unipod, the level of the shake detection signal in the Y-direction will be reduced, but the shake detection signal in the X-direction will not be reduced so much, as compared with when the camera is held with hands.) Thus, through the "logical multiplication" as described above, the unipod use can be distinguished from the tripod use. The final determination result is transmitted to determination result holding portion 44.

When the halt command from halt command portion 41 is not being transmitted, determination result holding portion 44 continues to transmit the final determination result, as it is, sent from logical multiplication portion 43 to drive signal calculator 50. When the halt command is transmitted from halt command portion 41, determination result holding portion 44 stores the final determination result at that time point of logical multiplication portion 43 and continues to transmit the stored final determination result to drive signal calculator 50 as long as the halt command is being transmitted.

Figure 3A:
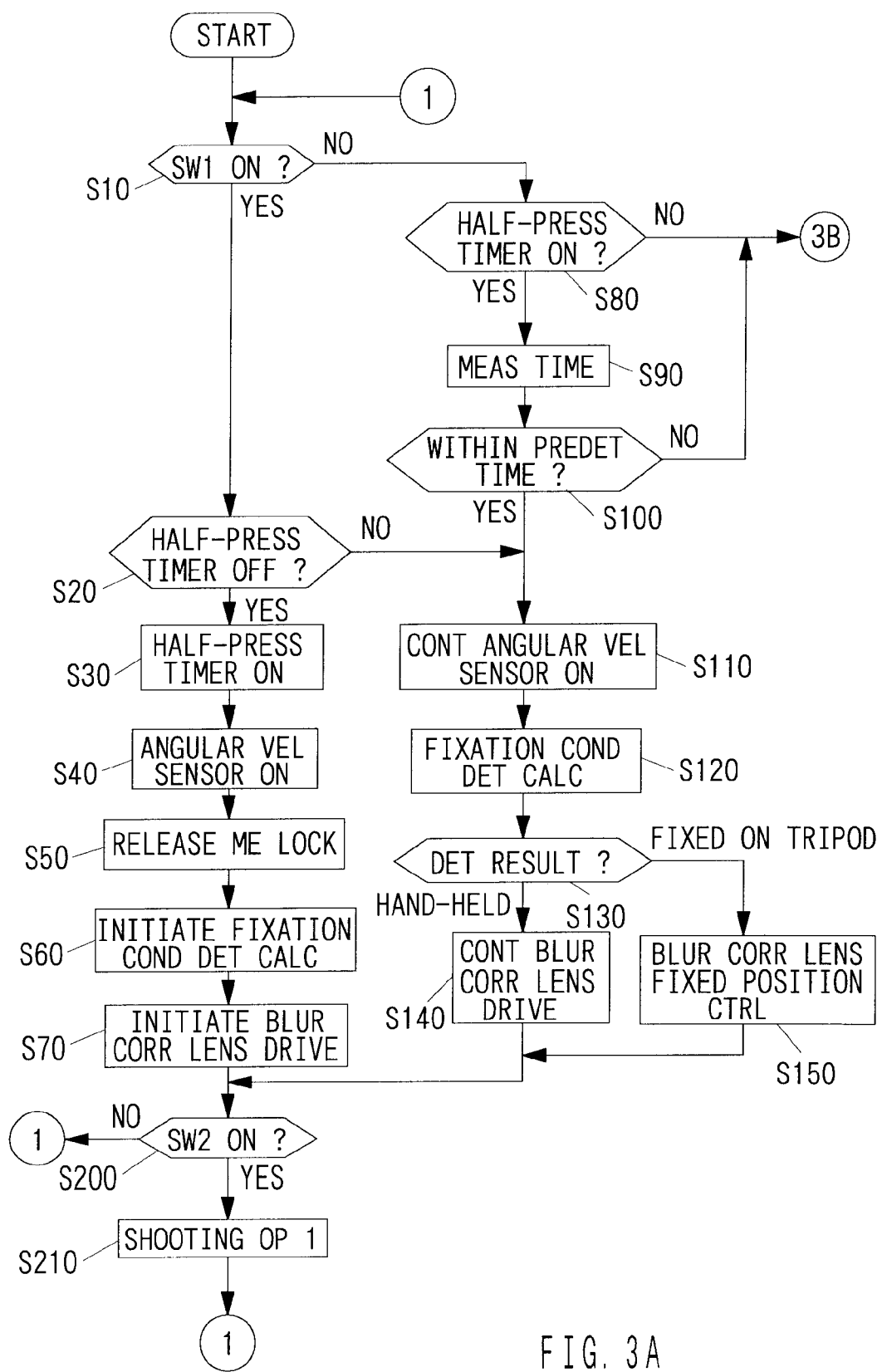
FIGS. 3A and 3B are flowcharts illustrating an overall control flow of a camera system operated under blur correction mode 1 of the first embodiment.
Figure 3B:
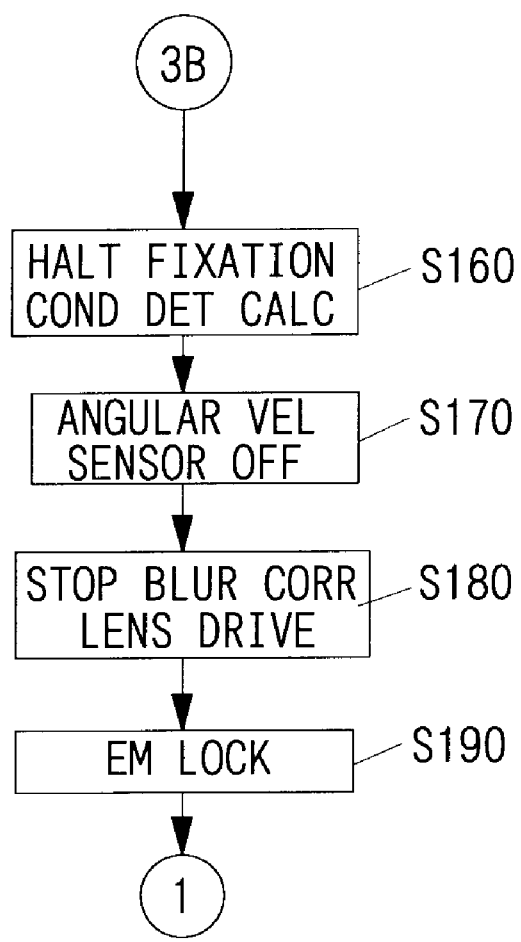

FIGS. 3A and 3B are flowcharts illustrating the overall control flow of the camera system under blur correction mode 1.

In S10, it is determined whether half-press switch SW1 is ON or OFF. If ON, then S10 is followed by S20; if OFF, then S10 is followed by S80.

In S20, it is determined whether half-press timer 130 is OFF or ON. If OFF, then S20 is followed by S30; if ON, then S20 is followed by S110.

In S30, half-press timer 130 is turned to be ON.

In S40, angular velocity sensor 10 is turned to be ON and the vibration detection is initiated.

In S50, electromagnetic lock 100 is released and blur correction lens 80 is made to be in a movable state.

In S60, fixation condition determination portion 40 initiates the fixation condition detection calculation.

In S70, the drive of blur correction lens 80 is initiated.

In S80, it is determined whether half-press timer 130 is ON or OFF. If ON, then S80 is followed by S90; if OFF, then S80 is followed by S160.

In S90, the time during which half-press switch SW1 is OFF and half-press timer 130 is ON is measured.

In S100, it is determined whether the time measured in S90 is within a predetermined time or not. If within the predetermined time, then S100 is followed by S110 and the drive of blur correction lens 80 is continued. If the time measured has exceeded the predetermined time, then S100 is followed by S160 and the drive of blur correction lens 80 is stopped.

In S110, the state in which angular velocity sensor 10 is ON is maintained.

In S120, the fixation condition determination calculation by fixation condition determination portion 40 is also continued.

In S130, it is determined whether the camera is in a hand-held condition or is in a fixed condition, by monitoring the fixation condition detection result from fixation condition determination portion 40. If in a hand-held condition, then S130 is followed by S140; if in a fixed condition, then S130 is followed by S150.

In S140, because the camera is in a hand-held condition, the drive of blur correction lens 80 is continued.

In S150, because the camera is in a fixed condition, blur correction lens 80 is controlled to be in a fixed position. However, in this case blur correction lens 80 stops at its current position as a result of the drive signal becoming to be zero, and thus it is not meant that the drive signal supply to driver portion 70 is stopped.

In S160, because half-press timer 130 has turned to be OFF, the fixation condition determination calculation is halted.

In S170, because half-press timer 130 has turned to be OFF, by stopping supplying power to angular velocity sensor 10, angular velocity sensor 10 is turned to be OFF.

In S180, the drive of blur correction lens 80 is stopped. In this step, after moving blur correction lens 80 to a predetermined position where the lens is to be locked, the drive is stopped.

In S190, blur correction lens 80 is locked by electromagnetic lock 100. After the locking, the drive signal supply to blur correction lens 80 is stopped.

In S200, it is determined whether full-press switch SW2 is ON or OFF. If ON, then S200 is followed by S210, shooting operation 1; if OFF, then the flow returns to S10.

Figure 4A:
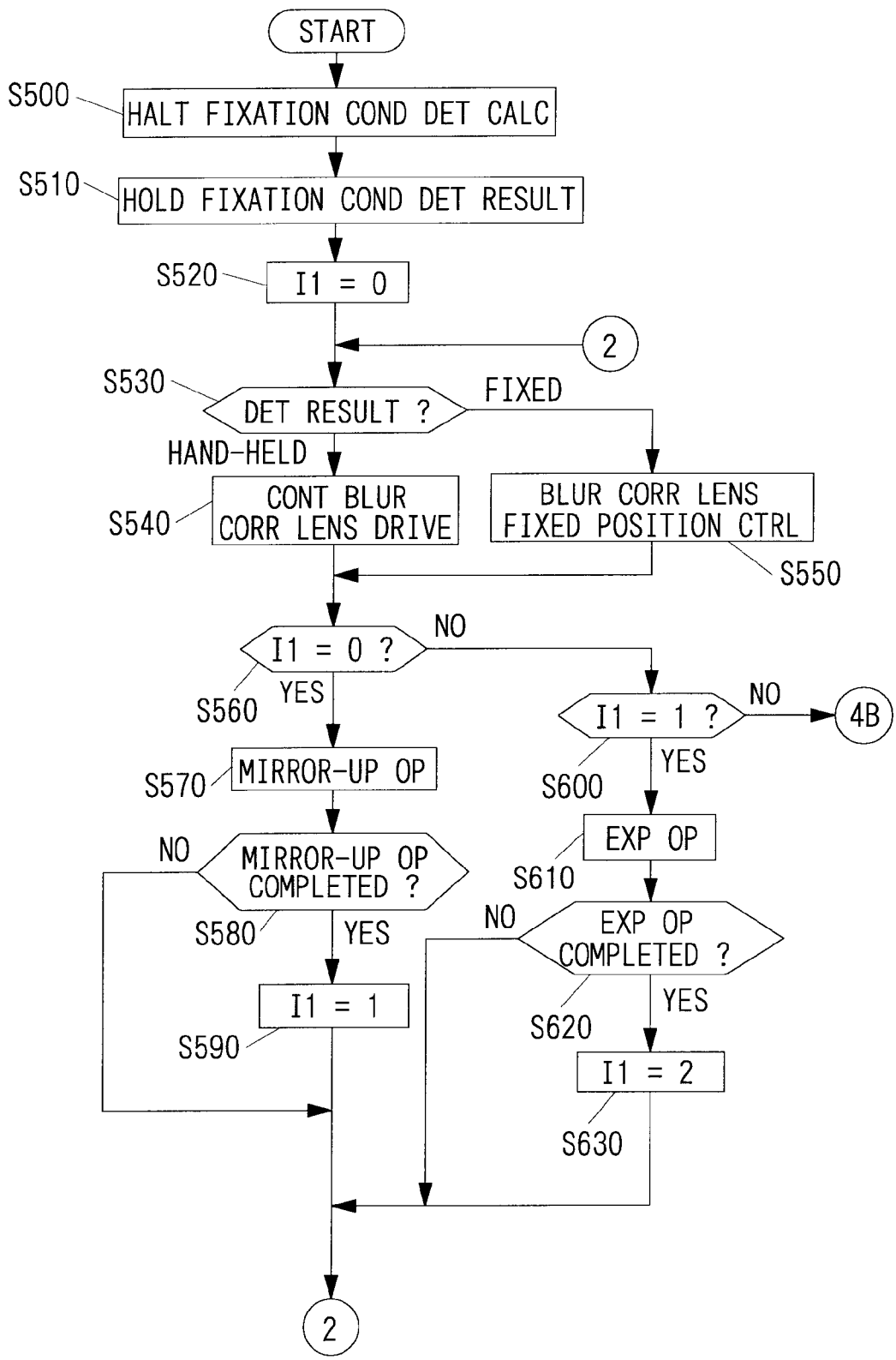
FIGS. 4A and 4B are flowcharts illustrating a flow of a shooting operation (S210, shooting operation 1, of FIG. 3) of the camera system operated under blur correction mode 1 of the first embodiment.
Figure 4B:
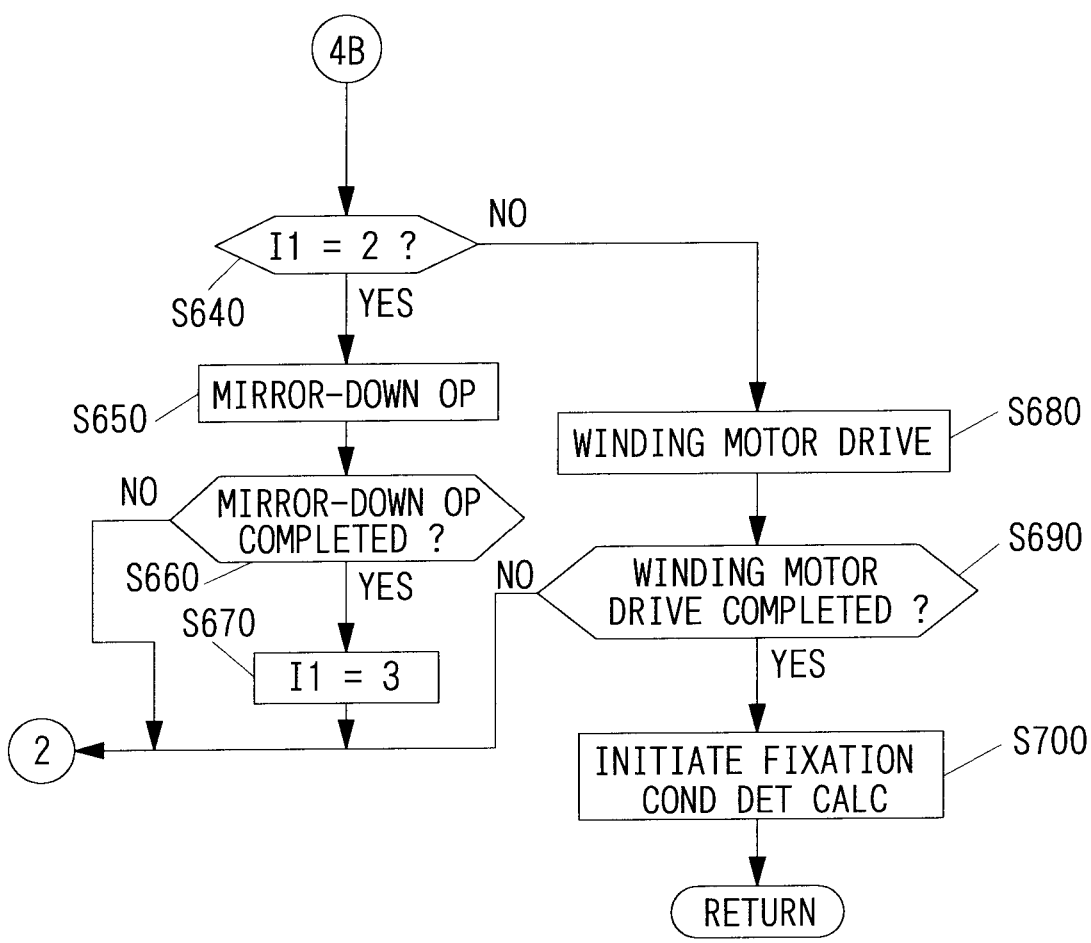

In S210, shooting operation 1 of the camera system, which is set under blur correction mode 1, is performed. Referring to FIGS. 4A and 4B, shooting operation 1 will be described next in detail.

FIGS. 4A and 4B are flowcharts illustrating the flow of the shooting operation (S210, shooting operation 1, of FIG. 3) of the camera system under blur correction mode 1.

In S500, fixation condition determination portion 40 halts the fixation condition determination calculation.

In S510, fixation condition determination portion 40 holds the fixation condition determination result at the time point when the portion halts the fixation condition determination calculation.

In S520, counter I1 for monitoring the progress of the shooting operation is reset to 0.

In S530, it is determined whether the camera is in a hand-held condition or is in a fixed condition, by monitoring the fixation condition determination result held in S510. If in a hand-held condition, then S530 is followed by S540; if in a fixed condition, then S530 is followed by S550.

In S540, because the camera is in a hand-held condition, the drive of blur correction lens 80 is continued.

In S550, because the camera is in a fixed condition, blur correction lens 80 is controlled to be in a fixed position. However, in this case blur correction lens 80 stops at its current position as a result of the drive signal becoming to be zero, and thus it is not meant that the drive signal supply to driver portion 70 is stopped.

In S560, it is determined whether counter I1 is 0 or not. If 0, then S560 is followed by S570 for performing a mirror flipping up operation; if not 0, then S560 is followed by S600.

In S570, the mirror flipping up operation is performed.

In S580, it is determined whether the mirror flipping up operation is completed or not. If not completed, then the flow returns to S530; if completed, then S580 is followed by S590.

In S590, because the mirror flipping up operation is completed, counter I1 is set to 1, and then the flow returns to S530.

In S600, it is determined whether counter I1 is 1 or not. If 1, then S600 is followed by S610 to perform the shooting operation including the shutter's open and close operations; if not 1, then S600 is followed by S640.

In S610, the shooting operation including the shutter's open and close operations is performed.

In S620, it is determined whether the shooting operation is completed or not. If not completed, then the flow returns to S530; if completed, then S620 is followed by S630.

In S630, because the shooting operation is completed, counter I1 is set to 2, and then the flow returns to S530.

In S640, it is determined whether counter I1 is 2 or not. If 2, then S640 is followed by S650 to perform the mirror flipping down operation; if not 2, then S640 is followed by S680.

In S650, the mirror flipping down operation is performed.

In S660, it is determined whether the mirror flipping down operation is completed or not. If not completed, then the flow returns to S530; if completed, then S660 is followed by S670.

In S670, because the mirror flipping down operation is completed, counter I1 is set to 3, and then the flow returns to S530.

In S680, because, at the time point when the flow has come to this step, operations up to the mirror flipping down operation are completed, film winding motor 180 is driven so as to wind up film 170 by a frame.

In S690, it is determined whether the driving of film winding motor 180 is completed or not. If not completed, then the flow returns to S530; if completed, then S690 is followed by S700.

In S700, because the entire shooting operation has been completed, fixation condition determination portion 40 reinitiates the fixation condition determination calculation, and after the reinitiating, the flow returns to the flow of FIGS. 3A and 3B.

In accordance with the flow of shooting operation 1, once the shooting operation is initiated, the fixation condition determination result at substantially the same time as the operation is initiated is held. And the fixation condition determination result is invariably maintained until the entire sequential shooting operation (from S560 to S690) is completed. Thus, because the fixation condition determination is not performed during the time period wherein noise may be on the output of the angular velocity sensor 10, the fixation condition determination result would not be erroneously reversed by the noise; and thus, whether the camera is in a fixed condition or in a hand-held condition, an optimum blur correction operation is effected for each of the conditions.

Figure 5:
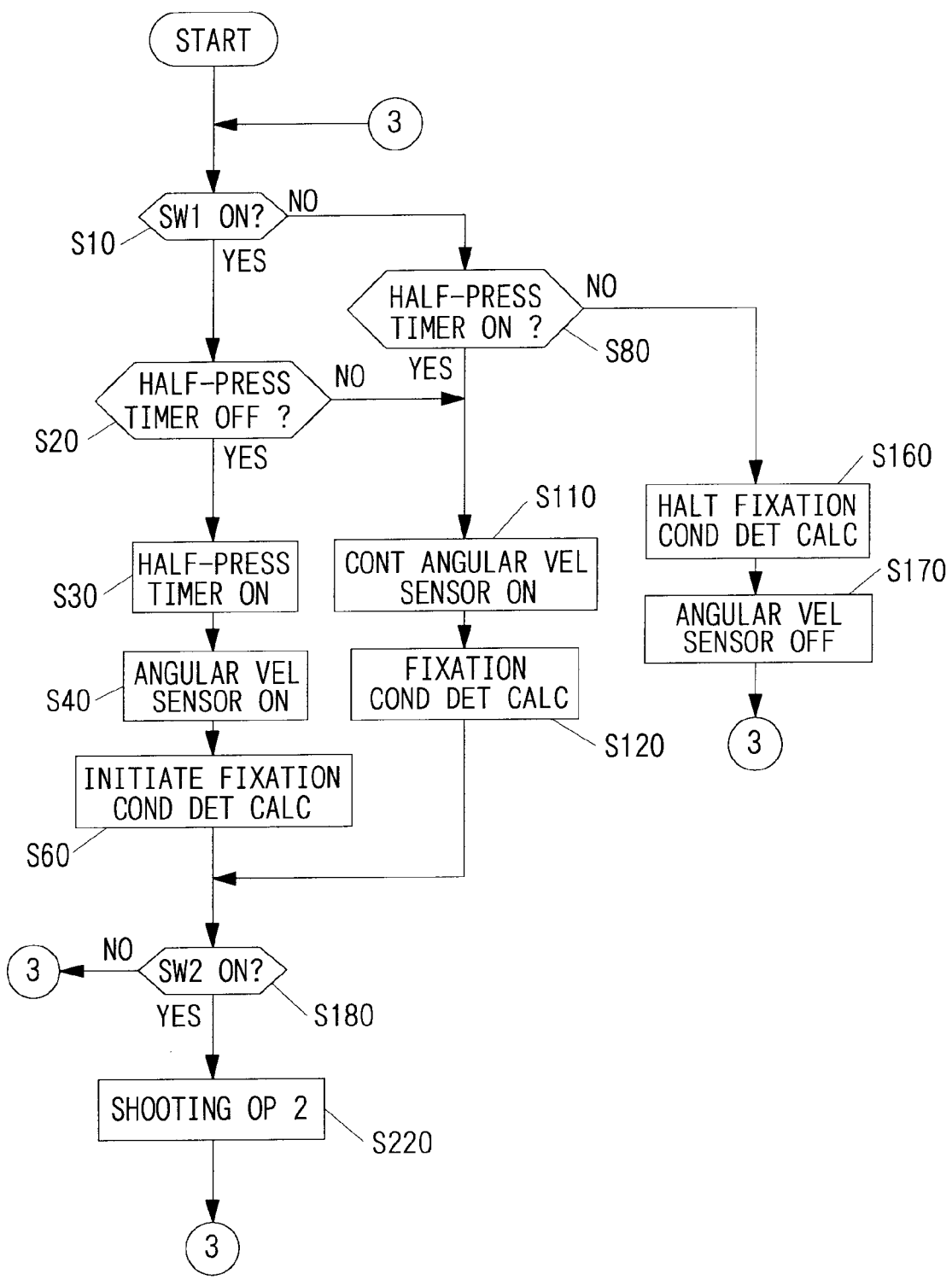
FIG. 5 is a flowchart illustrating an overall control flow of a camera system operated under blur correction mode 2 of the first embodiment.

FIG. 5 is a flowchart illustrating the overall control flow of the camera system under blur correction mode 2.

Because the operation of each step in FIG. 5 is substantially the same as that of the corresponding step in FIGS. 3A and 3B, detailed description thereof will be omitted here. Under blur correction mode 2, the vibration detection is performed until the shooting operation is initiated, but the drive of blur correction lens 80 is not performed. Accordingly, steps such as the electromagnetic locking/releasing and the driving/stopping of blur correction lens 80 do not exist in the flow, in contrast to the flow of FIGS. 3A and 3B.

Figure 6A:
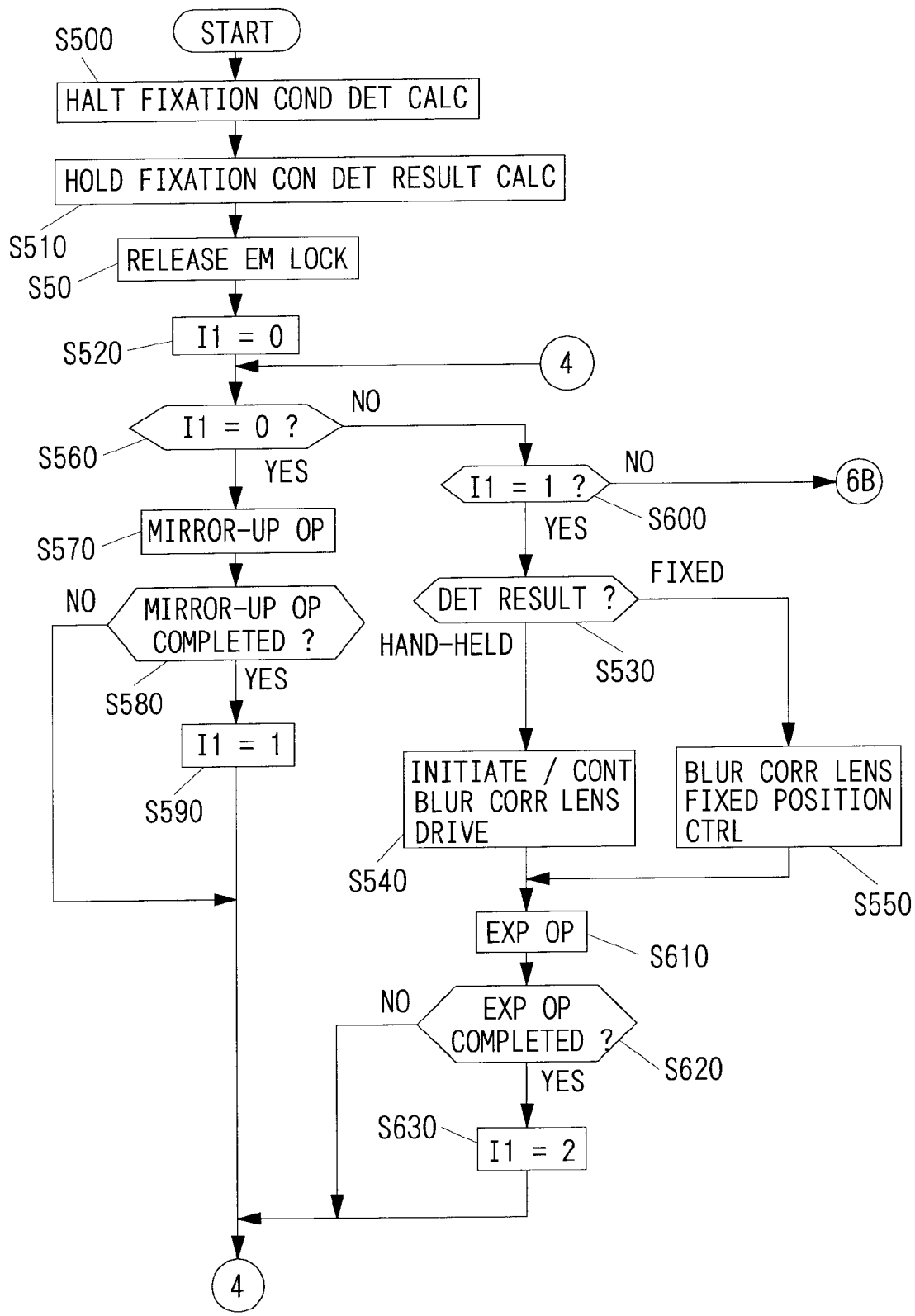
FIGS. 6A and 6B are flowcharts illustrating a flow of a shooting operation of the camera system operated under blur correction mode 2 of the first embodiment.
Figure 6B:
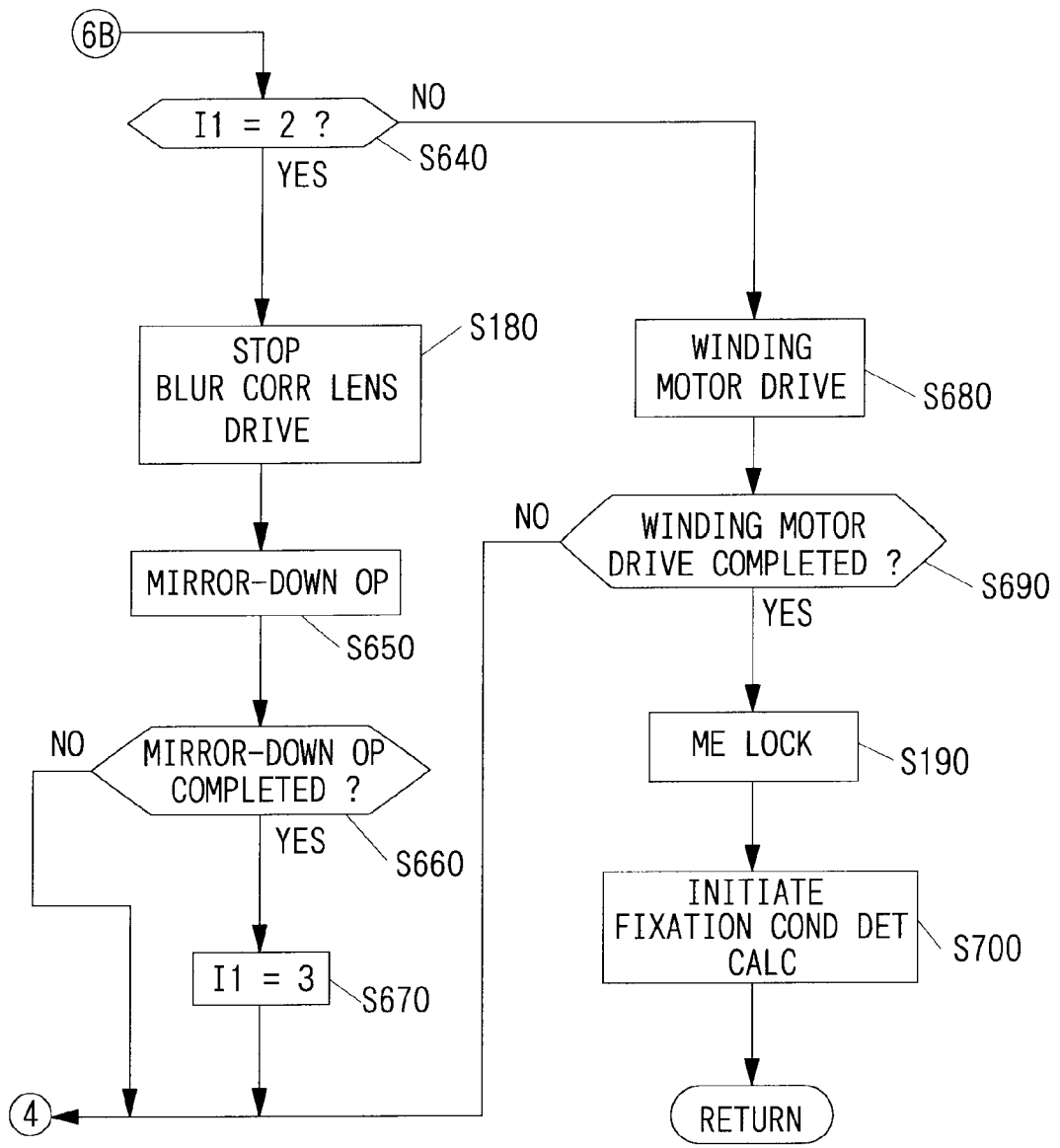

FIGS. 6A and 6B are flowcharts illustrating the flow of the shooting operation of the camera system under blur correction mode 2.

Because the operation of each step in FIGS. 6A and 6B is substantially the same as that of the corresponding step in FIGS. 3A, 3B, 4A, and 4B detailed description thereof will be omitted here. Under this mode, because the drive of blur correction lens 80 is initiated only after full-press switch SW2 is turned to be ON, such portions as related to the operation of electromagnetic lock 100 and to the monitoring of the fixation condition determination result are different from those of FIGS. 4A and 4B.

In accordance with the flow under blur correction mode 2, electromagnetic lock 100 is released after, with full-press switch SW2 being turned to be ON, the fixation condition determination result is held. Further, when driving of film winding motor 180 is completed, blur correction lens 80 is locked again, and on completion of the locking, the fixation condition determination calculation is reinitiated.

Thus, in the mode 2 flow the detection result is held during the sequential shooting operation (from S50 to S190) as in the mode 1 flow of FIGS. 4A and 4B; however, the electromagnetic locking/releasing operations are present in the mode 2 flow. Further, the determination result is monitored only before the exposure operation.

In the case of the mode 2 flow also, because the fixation condition determination is not performed during the time period wherein noise may be on the output of the angular velocity sensor 10, the fixation condition determination result would not be erroneously reversed by the noise; and thus, whether the camera is in a fixed condition or in a hand-held condition, an optimum blur correction operation is effected for each of the conditions.

(Second Embodiment)

Because except for the fixation condition detection operation, this embodiment is the same as the first embodiment, description of the other operations will be omitted.

Figure 7:
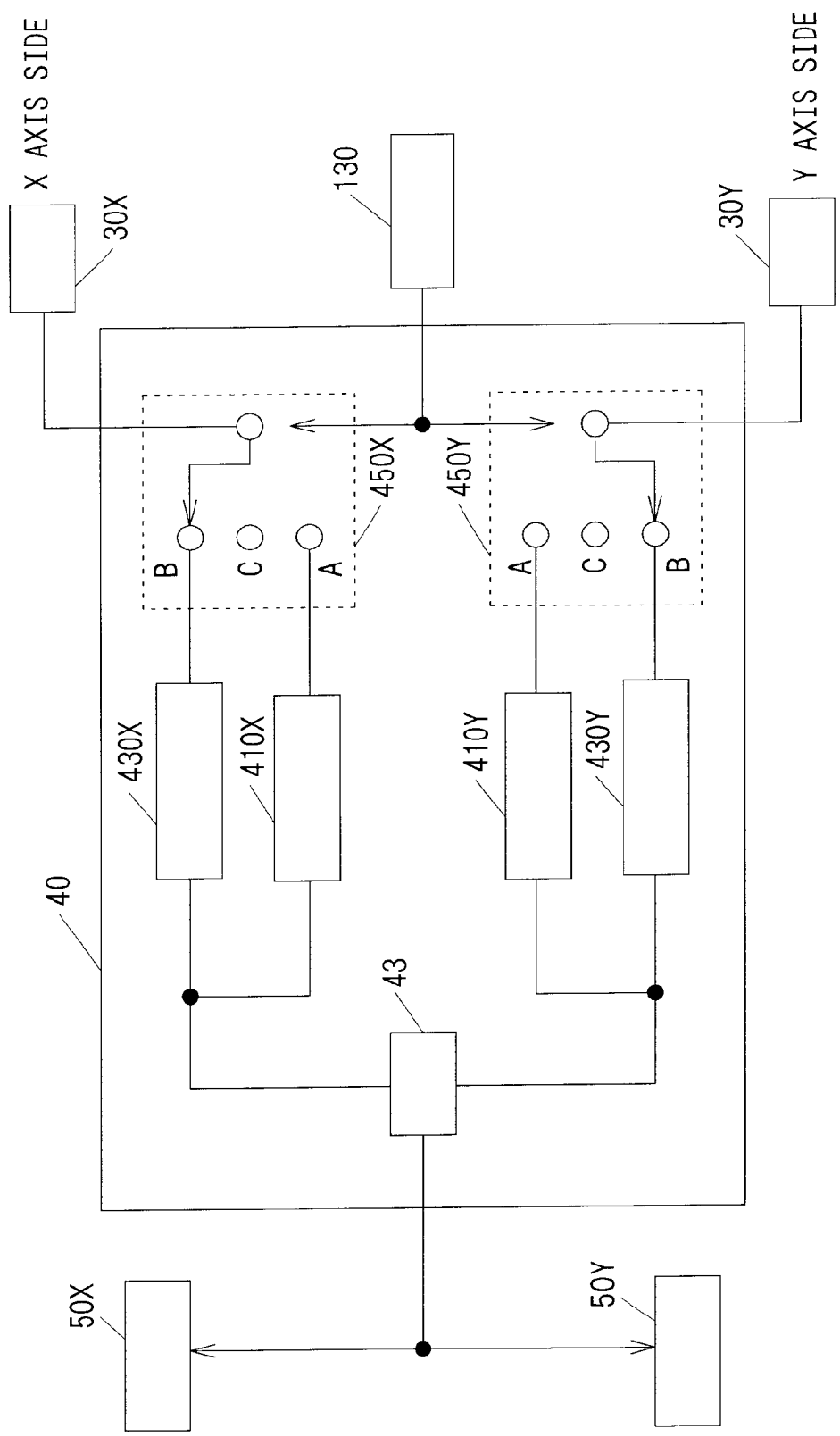
FIG. 7 illustrates in detail an inner configuration of supporting condition determination portion 40 of a blur correction camera of a second embodiment.

FIG. 7 illustrates in detail the inner configuration of supporting condition determination portion (fixation condition determination portion) 40 of a blur correction camera according to the second embodiment.

Fixed condition detection portion (stable support condition detection portion) 410 performs calculation for detecting whether the camera is in a fixed condition or not based on a shake detection signal (digital signal) sent from A/D converter 30. Fixed condition detection portion 410 performs calculation for detecting whether the camera is in a fixed condition or not while supporting condition determination portion (fixation condition determination portion) 40 is in a state of determination that the camera is held with hands; in contrast, while supporting condition determination portion 40 is in a state of determination that the camera is fixed, fixed condition detection portion 410 performs an operation to hold the state of determination.

In other words, fixed condition detection portion 410 performs a "one-way" detection in which transition from a hand-held condition to a fixed condition is detected, but transition from a fixed condition to a hand-held condition is not detected.

The calculation is implemented by monitoring the level and the frequency of the shake detection signal. For example, when the level is smaller than a predetermined level or the frequency is low, it is determined that the camera is in a fixed condition. There can be listed several other calculation methods, and any one of them may be used. The determination result is outputted to logical multiplication portion 43.

Fixed condition detection portion 410 is constituted of detection portion 410X dedicated to the X-axis and detection portion 410Y dedicated to the Y-axis, and they performs the calculation separately. Further, both of fixed condition detection portions 410X and 410Y operate only when the shake detection signal is inputted to them through shake detection signal switching portion 450.

Hand-held condition detection portion (non-stable support condition detection portion) 430 performs calculation for detecting whether the camera is in a hand-held condition or not based on a shake detection signal (digital signal) sent from A/D converter 30. Hand-held condition detection portion 430 performs calculation for detecting whether the camera is in a hand-held condition or not while supporting condition determination portion (fixation condition determination portion) 40 is in a state of determination that the camera is fixed; in contrast, while supporting condition determination portion 40 is in a state of determination that the camera is held with hands, hand-held condition detection portion 430 performs an operation to hold the state of determination.

In other words, hand-held condition detection portion 430 performs a "one-way" detection in which transition from a fixed condition to a hand-held condition is detected, but transition from a hand-held condition to a fixed condition is not detected.

Thus, when hand-held condition detection portion 430 is operated, "fixed condition→hand-held condition" transition is detected, but "hand-held condition→fixed condition" transition is not detected. Also, as described above, when fixed condition detection portion 410 is operated, "hand-held condition→fixed condition" transition is detected, but "fixed condition→hand-held condition" transition is not detected. Accordingly, frequent detection of "hand-held condition" and "fixed condition" due to noise or the like is avoided.

The calculation performed by hand-held condition detection portion 430 is implemented by monitoring the level and the frequency of the shake detection signal, as in the case of fixed condition detection portion 410. For example, when the level is larger than a predetermined level or the frequency is high, it is determined that the camera is in a hand-held condition. There can be listed several other calculation methods, and any one of them may be used. The determination result is also outputted to logical multiplication portion 43.

Hand-held condition detection portion 430 is also constituted of detection portion 430X dedicated to the X-axis and detection portion 430Y dedicated to the Y-axis, and they performs the calculation separately. Further, both of hand-held condition detection portions 430X and 430Y operate only when the shake detection signal is inputted to them through shake detection signal switching portion 450.

Shake detection signal switching portion 450 controls the flow of the shake detection signal. Shake detection signal switching portion 450 is also constituted of switching portion 450X dedicated to the X-axis and switching portion 450Y dedicated to the Y-axis, and each of them is provided with three terminals, A, B, and C. The flow of the shake detection signal is controlled by controlling the connection between the output terminal of A/D converter 30 and those terminals.

When the output terminal of A/D converter 30 is connected to terminal A, the shake detection signal is inputted to fixed condition detection portion 410; when connected to terminal B, the signal is inputted to hand-held condition detection portion 430. Further, when the output terminal of A/D converter 30 is connected to terminal C, the shake detection signal is inputted neither to fixed condition detection portion 410 nor to hand-held condition detection portion 430.

In contrast to fixed condition detection portion 410 and hand-held condition detection portion 430, shake detection signal switching portions 450X and 450Y are not separately controlled, but are controlled being related to each other. Specifically, the two switching portions are controlled dependently on each other so that one of "A terminal connection," "B terminal connection," and "C terminal connection" is simultaneously realized in both of the two switching portions.

When C terminal connection is realized, because the shake detection signal is inputted neither to fixed condition detection portion 410 nor to hand-held condition detection portion 430, neither of those portions operates. Further, when A terminal connection is realized, the shake detection signal is inputted to fixed condition detection portions 410X and 410Y. When B terminal connection is realized, the shake detection signal is inputted to hand-held condition detection portions 430X and 430Y. Because the shake detection signal is thus inputted to either one of fixed condition detection portion 410 and hand-held condition detection portion 430, those portions do never simultaneously perform calculation. Therefore, compared with a detection mode wherein the detection portions 410 and 430 simultaneously perform calculation (i.e., the fixed condition detection and the hand-held condition detection are simultaneously performed), required amount of calculation is smaller in this embodiment.

The flow of the shake detection signal is switched in response to the time measured by half-press timer 130. First, the output of A/D converter 30 is connected to terminal C until a predetermined time passes after, with half-press switch SW1 being turned to be ON, power has been supplied to angular velocity sensor 10. Thus, during this time period, neither the fixed condition detection nor the hand-held condition detection is performed, and supporting condition determination portion (fixation condition determination portion) 40 holds a fixed condition determination.

After the lapse of the predetermined time, the output is first connected to terminal B; and, after the condition has continued for a certain time, the output is next connected to terminal A. After a predetermined time during which this A terminal connection is maintained, B terminal connection is realized again; thereafter, with the same sequence being repeated, the fixed condition detection and the hand-held condition detection are alternately and cyclically performed.

It is to be noted that the above C terminal connection is realized only up until the predetermined time passes after half-press switch SW1 has turned to be ON and is never realized after the lapse of the predetermined time.

Logical multiplication portion 43 performs the final supporting condition determination based on the fixation condition detection results sent from the two fixed condition detection portions 410X and 410Y or from the two hand-held condition detection portions 430X and 430Y. Logical multiplication portion 43 determines the final supporting condition by taking a pair of the fixation condition detection results into consideration in a sense of a logical multiplication. More specifically, the final supporting condition is determined as follows:

If a "hand-held condition" holds with respect to both of the X-axis and the Y-axis, then the final supporting condition is determined to be a "hand-held condition."

If a "hand-held condition" holds with respect to either the X-axis or the Y-axis, then the final supporting condition is determined to be a "hand-held condition."

If a "fixed condition" holds with respect to both of the X-axis and the Y-axis, then the final supporting condition is determined to be a "fixed condition."

When the camera is held with hands, the level of shake detection signal is rather large in both the X-axis and the Y-axis. In contrast, when it is fixed on a stable base such as a tripod, the level of the shake detection signal is small in both the X-axis and the Y-axis. When it is fixed on a unipod, although the level of the shake detection signal in one of the axes will be reduced, the level of the shake detection signal in the other axis will not be reduced so much. (For example, when the camera is fixed horizontally on the unipod, the level of the shake detection signal in the Y-direction will be reduced, but the shake detection signal in the X-direction will not be reduced so much, as compared with when the camera is held with hands.) Thus, through the "logical multiplication" as described above, the unipod use can be distinguished from the tripod use.

Figure 8A:
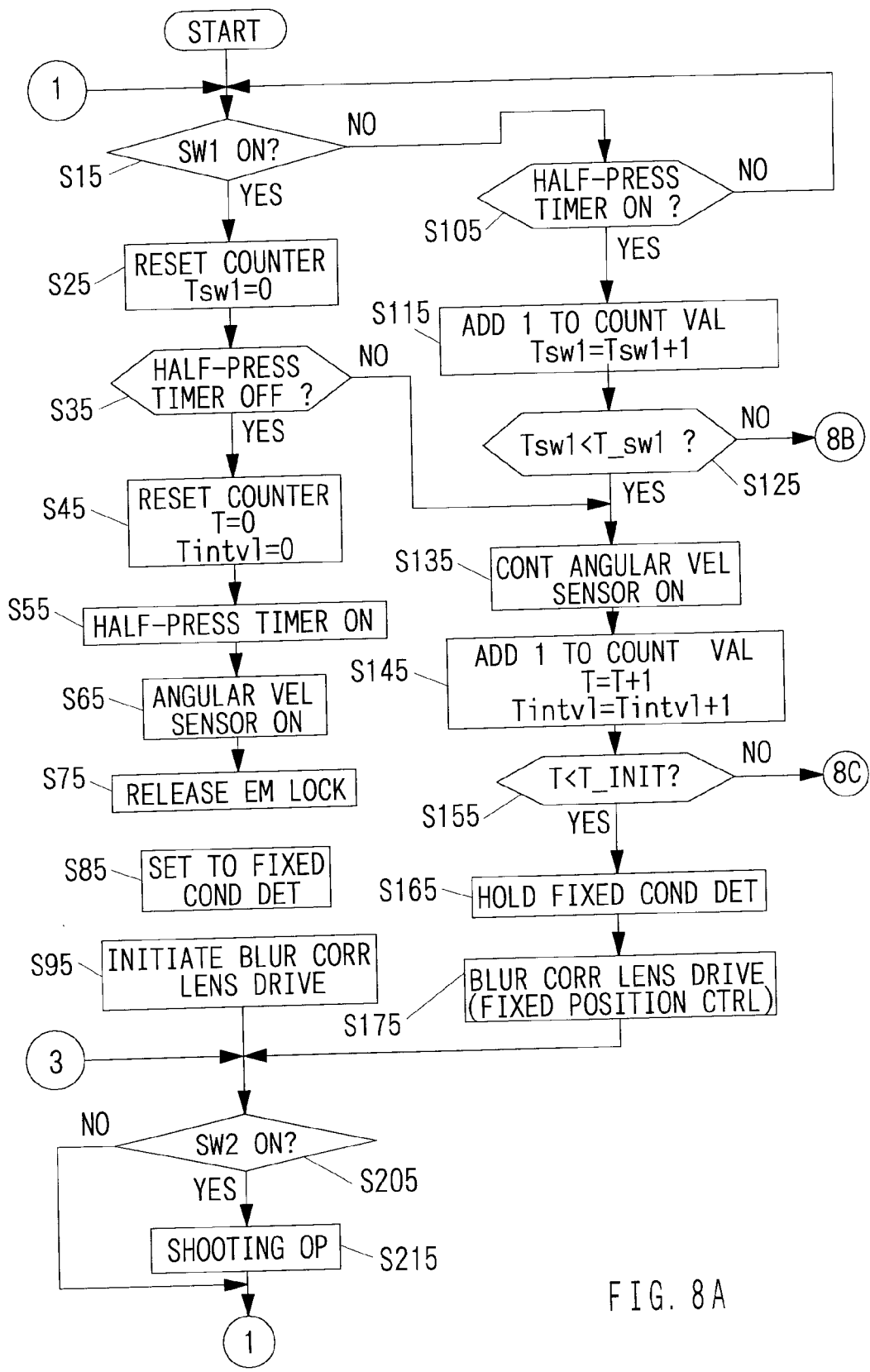
FIGS. 8A, 8B, and 8C are flowcharts illustrating an overall control flow of the blur correction camera system of the second embodiment.
Figure 8B:
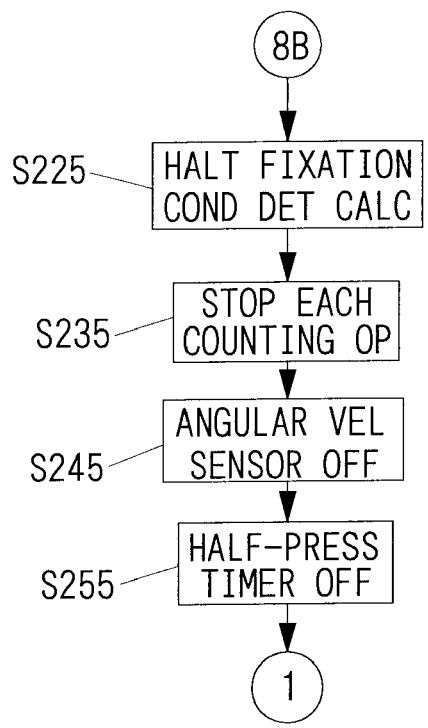
Figure 8C:
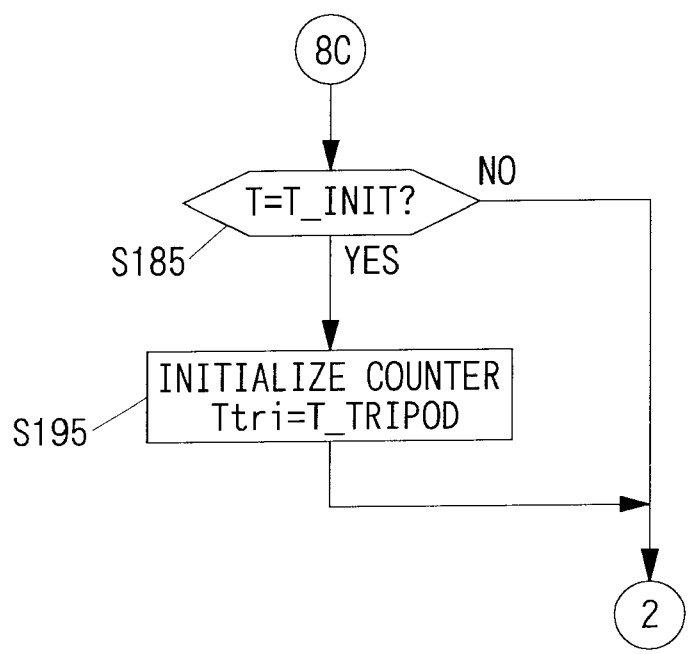

FIGS. 8A, 8B, and 8C are flowcharts illustrating the overall control flow of the blur correction camera system of the second embodiment.

The flow of the flowcharts starts just when the camera's main power supply (not shown in FIG. 1) is turned ON; the flow ends substantially at the same time as the main power is turned OFF; and, in the flow, certain processes are repeated at a predetermined time interval while the main power is on. For the purpose of simplicity, processes in the flowcharts common to both of X-axis and Y-axis are collectively illustrated without specifying the axis. Further, it is assumed in the flowcharts that blur correction mode 1 is selected by blur correction mode setting switch 90. With respect to portions in which different processes are followed depending on whether blur correction mode 1 is selected or blur correction mode 2 is selected, such different processes will described in those portions.

In S15, it is determined whether half-press switch SW1 is ON or OFF. If ON, then S15 is followed by S25; if OFF, then S10 is followed by S105.

In S25, counter Tsw1 is reset, and thus its count value is made to be 0. Counter Tsw1 is a counter for measuring the lapse time which is measured from the time point when half-press switch SW1 turns to be OFF, and its count value takes on integers. The count value of this counter is maintained to be 0 while half-press switch SW1 is ON; and the counter operates only when half-press switch SW1 is OFF and half-press timer 130 is ON.

In S35, it is determined whether half-press timer 130 is OFF or ON. If OFF, then S35 is followed by S45; if ON, then S35 is followed by S135.

In S45, counter T and counter Tintvl are reset, and thus their respective count values are made to be 0. Counter T is a counter for measuring the time during which the half-press time is ON. Counter Tintvl is a counter for monitoring the timing for switching the terminals of shake detection signal switching portion 450 and is reset at a predetermined time interval (for details, see S305–S315 of FIG. 9A). Each of those counters is an integer-type counter, initiates its counting operation at the same time as half-press timer is ON, and continues the counting operation while half-press timer is ON.

In S55, half-press timer 130 is turned to be ON.

In S65, angular velocity sensor 10 is turned to be ON and the vibration detection is initiated. In addition, the converting operation by A/D converter 30 initiates in S65.

In S75, electromagnetic lock 100 is released and blur correction lens 80 is made to be in a movable state. However, electromagnetic lock 100 is released only when blur correction mode 1 is selected by blur correction mode setting switch 90. When blur correction mode 2 is selected, this step is skipped because electromagnetic lock 100 is released when the shooting operation is begun.

In S85, the supporting condition determination result is set to be as a fixed condition determination. In addition, C terminal connection is realized in shake detection signal switching portion 450.

In S95, the drive of blur correction lens 80 is initiated. However, because the fixed condition determination is set in S85, blur correction lens 80 is controlled to be in a fixed position by drive signal calculator 50.

In S105, it is determined whether half-press timer 130 is ON or OFF. If ON, then S105 is followed by S115; if OFF, then the flow returns to S15, and the determination as to whether half-press switch SW1 is ON or OFF is continued.

At the time point when the flow has come to S115, half-press switch SW1 is OFF, and half-press timer 130 is ON. In S115, to measure the time during which this condition continues, 1 is added to the count value of counter Tsw1.

In S125, it is determined whether the value of counter Tsw1 is smaller than threshold value T_SW1 or not. Here, threshold value T_SW1 is a constant for defining the upper limit of counter Tsw1; more specifically, threshold value T_SW1 defines the time from when half-press switch SW1 is OFF to when half-press timer 130 is OFF. If the value of counter Tsw1 is smaller than the threshold value, i.e., if it is determined in the affirmative, S125 is followed by S135, without turning half-press timer 130 to be OFF. In contrast, if the value of counter Tsw1 has reached the threshold value, i.e., if it is determined in the negative in this step, S125 is followed by S225, and a process to turn half-press timer 130 to be OFF and processes related to the OFF process are performed.

In S135, angular velocity sensor 10 is continued to be ON, and the shake detection is performed. The converting operation by A/D converter 30 is also continued.

In S145, because, at the time point when the flow has come to this step, half-press timer 130 is ON, 1 is added to each of the count value of counter T and counter Tintvl.

In S155, it is determined whether the value of counter T is smaller than threshold value T_INIT or not. Here, threshold value T_INIT is a constant for defining the time to hold the fixed condition determination set in step S85, and supporting condition determination portion (fixation condition determination portion) 40 holds the fixed condition determination while the value of counter T has not reached threshold value T_INIT. If it is determined in the affirmative in this step, i.e., if the value of counter T has not reached threshold value T_INIT, S155 is followed by S165, and the fixed condition determination is held. In contrast, if it is determined in the negative in this step, i.e., if it is determined that the value of counter T has reached or exceeded the threshold value, S155 is followed by S185.

In S165, supporting condition determination portion (fixation condition determination portion) 40 holds the fixed condition determination. C terminal connection is held in shake detection signal switching portion 450.

In S175, the drive of blur correction lens 80 is continued. However, because the fixed condition determination is held by S85, drive signal calculator 50 outputs a signal so that blur correction lens 80 is controlled to be in a fixed position.

In S185, it is determined whether the value of counter T is equal to threshold value T_INIT or not. If it is determined in the affirmative, S185 is followed by S195; if it is determined in the negative, S185 is followed by S305 of FIG. 9A. Because at the time point when the flow has come to S185, the value of counter T is equal or more than the threshold value T_INIT, the holding of the fixed condition determination is stopped, and then a hand-held condition detection calculation or a fixed condition detection calculation is next performed. The flow of those calculations will be described later, referring to FIGS. 9A and 9B.

In S195, counter Ttri is initialized, and its value is set to be value T_TRIPD. Here, threshold value T_TRIPD is a threshold value for defining the upper limit of the time during which the fixed condition detection calculation is performed, i.e., during which fixed condition detection portion 410 continuously operates; and counter Ttri is a counter for measuring the operation duration time of fixed condition detection portion 410, and its count value also takes on integers. The reason why the value of counter Ttri is set to be threshold value T_TRIPD in this step is that the flow can be advanced to the steps of S365–S385 of FIG. 9A. By this, the fixed condition determination is held for the predetermined time (T<T_INIT) from the time point when half-press timer 130 turned to be ON; and the hand-held condition detection is initiated at the same time as the fixed condition determination is broken (T=T_INIT).

In steps S225–S255, the processes to turn half-press timer 130 to be OFF are performed. First, in S225, the fixation condition determination calculation is halted.

In S235, the operation of each counter that has operated while half-press timer 130 was ON is stopped.

In S245, by stopping supplying power to angular velocity sensor 10, angular velocity sensor 10 is turned to be OFF.

In S255, half-press timer 130 is turned to be OFF. Next, the flow returns to S15, and the detection of the condition of half-press switch SW1 is performed again.

Figure 9B:
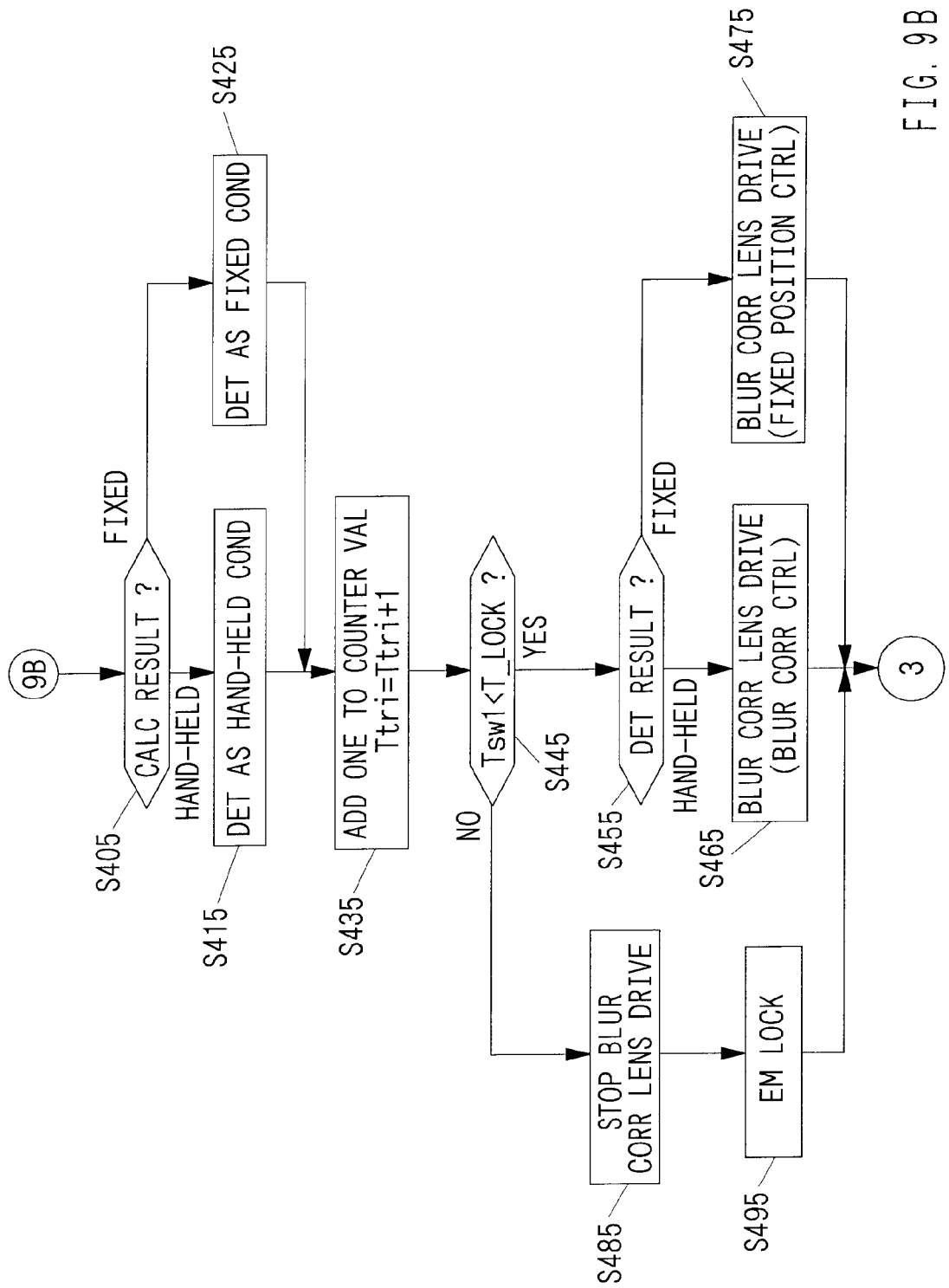

FIGS. 9A and 9B are flowcharts illustrating the flow of calculations performed in supporting condition determination portion (fixation condition determination portion) 40 of the blur correction camera according to the second embodiment.

In S305, it is determined whether the value of counter Tintvl is equal to threshold value T_INTRVL or not. Here, threshold value T_INTRVL is a threshold value for defining the upper limit of counter Tintvl. As described in connection with FIG. 7, fixed condition detection portion 410 and hand-held condition detection portion 430 operate alternately and periodically. Threshold value T_INTRVL is a constant for defining the period.

In S315, counter Ttri and counter Tintvl are reset, and thus their respective count values are made to be 0.

In S325, the hand-held condition detection calculation is halted; in other words, the operation of hand-held condition detection portion 430 is stopped. If hand-held condition detection portion 430 is not operating at the time point when the flow has come to this step, this step may be skipped.

In S335, the fixed condition detection calculation is initiated. In this step, A terminal connection is realized in shake detection signal switching portion 450, and the operation of fixed condition detection portion 410 is initiated.

In S345, it is determined whether the value of counter Ttri is smaller than threshold value T_TRIPD or not. If it is determined in the affirmative, S345 is followed by S355; if it is determined in the negative, S345 is followed by S365.

In S355, the fixed condition detection calculation is executed; in other words, the operation of fixed condition detection portion 410 is continued.

In S365, it is determined whether the value of counter Ttri is equal to threshold value T_TRIPD or not. If it is determined in the affirmative, S365 is followed by S375; if it is determined in the negative, S365 is followed by S395.

In S375, the fixed condition detection calculation is halted; in other words, the operation of fixed condition detection portion 410 is stopped. Taking this step and S365 into consideration, the time during which the fixed condition detection calculation is continuously performed is equal to a time period of T_TRIPD.

In S385, the hand-held condition detection calculation is initiated. In this step, B terminal connection is realized in shake detection signal switching portion 450, and the operation of hand-held condition detection portion 430 is initiated.

In S395, the hand-held condition detection calculation is executed; in other words, the operation of hand-held condition detection portion 430 is continued.

In S405, it is determined whether the calculation result from fixed condition detection portion 410 or from hand-held condition detection portion 430 indicates a fixed condition or a hand-held condition. If a fixed condition is indicated, S405 is followed by S415; if a hand-held condition is indicated, S405 is followed by S425.

In S415, supporting condition determination portion (fixation condition determination portion) 40 finally determines that the camera is in a hand-held condition.

In S425, supporting condition determination portion (fixation condition determination portion) 40 finally determines that the camera is in a fixed condition.

It is to be noted that although, for the purpose of simplicity, processes only with respect to a certain single axis are illustrated, the processes are actually performed with respect to the two axes. The steps S405–S425 also include the operation in which the final fixation condition determination result is determined by taking the fixation condition determination results with respect to each axes into consideration in a sense of a logical multiplication In S435, 1 is added to the count value of counter Ttri.

In S445, it is determined whether the value of counter Tsw1 is smaller than threshold value T_LOCK or not. Here, threshold value T_LOCK is a constant for defining the time from when half-press switch SW1 is OFF to when blur correction lens 80 is locked. If it is determined in the affirmative, then S445 is followed by S455; in this case, electromagnetic lock 100 is held to be in a released state. In contrast, if it is determined in the negative, the flow proceed to S485 and then to S495 wherein blur correction lens 80 is locked.

In S455, the fixation condition determination result is monitored. If the camera is in a hand-held condition, then S455 is followed by S465; if in a fixed condition, then S455 is followed by S475.

In S465, because the camera is in a hand-held condition, blur correction lens 80 is controlled based on the output from angular velocity sensor 10; in other words, an image blur correction operation is performed.

In S475, because the camera is in a fixed condition, blur correction lens 80 is controlled to be in a fixed position; in other words, the image blur correction operation is actually stopped.

In S485, the drive of blur correction lens 80 is stopped.

In S495, blur correction lens 80 is locked.

In the flow of FIGS. 9A and 9B, the steps S305–S435 represent the calculation performed in supporting condition determination portion (fixation condition determination portion) 40. Those steps are performed whether blur correction mode 1 is selected or blur correction mode 2 is selected.

The features of the flow of FIGS. 9A and 9B can be summarized as follows:

(1) The fixation condition detection is performed with a period of T_INTRVL, and counter Tintvl and counter Ttri are reset at the end of the period.

(2) When Tintvl T_INTRVL and Ttri<T_TRIPD, the fixed condition detection is performed.

(3) When Tintvl T_INTRVL and Ttri T_TRIPD, the hand-held condition detection is performed.

However, the following inequality must hold for the hand-held condition detection to be performed:

$$T\_TRIPD < T\_INTRVL \quad (2)$$

In addition, under blur correction mode 2, the locking/releasing operations of electromagnetic lock 100 are performed in synchronization with the shooting operation. Thus, it is only under blur correction mode 1 that the steps S445–S495 are performed at the location shown in FIG. 9B. Under blur correction mode 2, the steps S445–S495 are performed during the shooting operation which starts after full-press switch SW2 being turned to ON.

Figure 10:
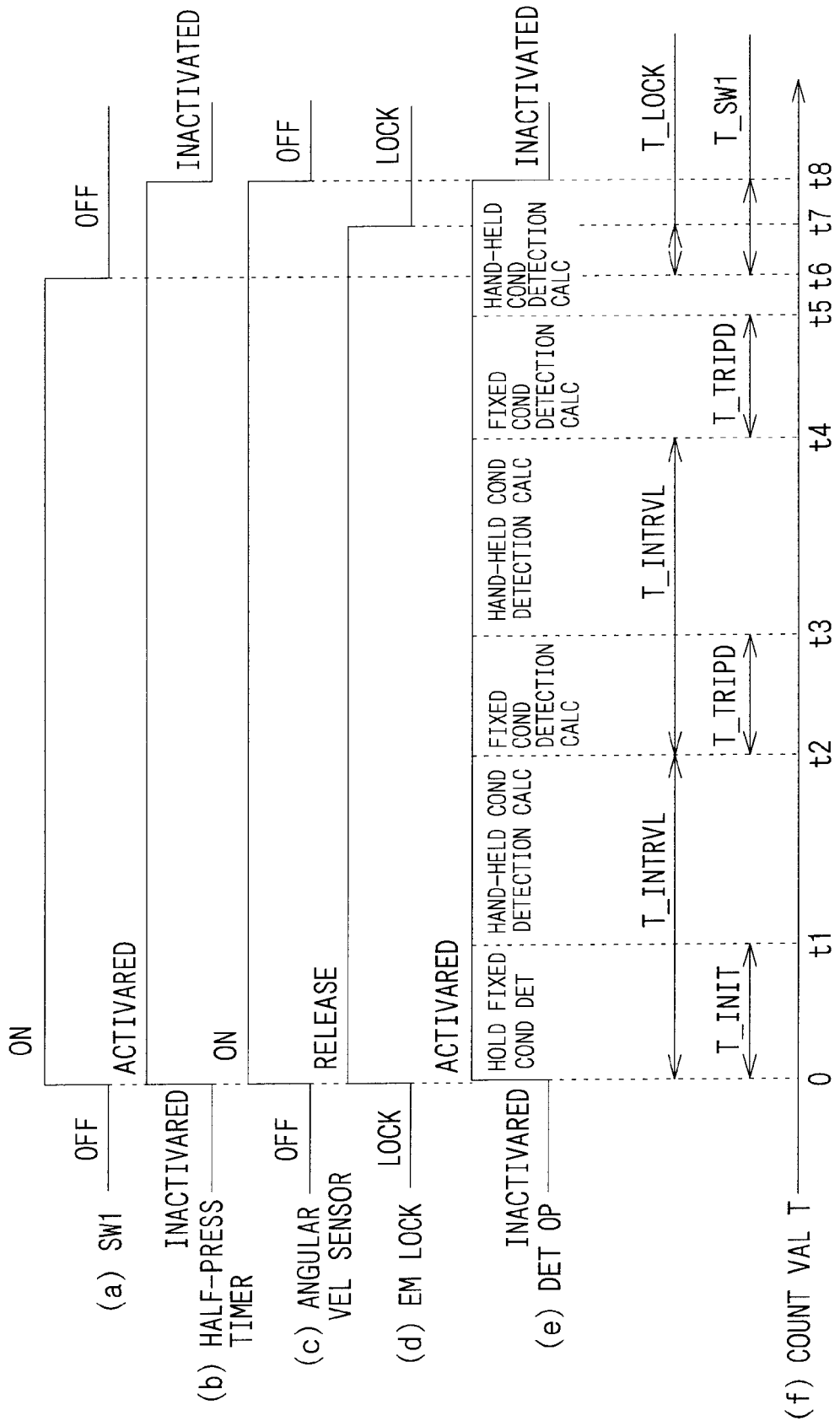
FIG. 10 is a time chart illustrating an operation of supporting condition determination portion 40 of the blur correction camera according to the second embodiment.

FIG. 10 is a time chart illustrating the operation of supporting condition determination portion (fixation condition determination portion) 40 of the blur correction camera according to the second embodiment.

(1) In this time chart, with respect to the initial condition of the camera, it is assumed that both of half-press switch SW1 and half-press timer 130 are OFF.

(2) At the time point when half-press switch SW1 is turned to be ON, the operation of half-press timer 130 is initiated. At this time point, the count value of the time is 0 (T=0).

(3) Substantially at the same time as half-press timer 130 is initiated, power is supplied to angular velocity sensor 10, and thus the sensor 10 is turned to be ON. Electromagnetic lock 100 is also released, and the control of blur correction lens 80 is initiated. However, only under blur correction mode 1, electromagnetic lock 100 is released at this time point; under blur correction mode 2, electromagnetic lock 100 is not released at this time point.

(4) During the time period when the count value of half-press timer 130 is between 0 and t1 (T=0~t1), supporting condition determination portion (fixation condition determination portion) 40 holds the fixed condition determination. Thus, during this time period, drive signal calculator 50 outputs a signal so that blur correction lens 80 is controlled to be in a fixed position. Here, t1=T_INIT. The level of the drift components included in the output of angular velocity sensor 10 is large just after power is supplied to the sensor. For this reason, when the blur correction is started with the camera being fixed on a tripod or the like; the camera is affected by the drift components, and the resultant image deteriorate all the more. To address this problem, by introducing unconditionally the fixed condition determination and stopping the blur correction operation during the time period just after power was supplied, such image deterioration due to the drift components can be avoided.

(5) At the time when the count value of half-press timer 130 reaches t1 (T=t1), fixation condition detection operations in supporting condition determination portion (fixation condition determination portion) 40 are initiated. During the time period, T=t1~t2, supporting condition determination portion (fixation condition determination portion) 40 executes the hand-held condition detection calculation; in other words, hand-held condition detection portion 430 is operated. Thus, during this time period, the determination result may change from "fixed condition" to "hand-held condition," but not from "hand-held condition" to "fixed condition."

(6) At the time when the count value reaches t2 (T=t2), the hand-held condition detection calculation is halted, and the fixed condition detection calculation is initiated. Here, t2=T_INTRVL.

(7) During the time period, T=t2~t3, the fixed condition detection calculation is executed; in other words, fixed condition detection portion 410 is operated. Thus, during this time period, the determination result may change from "hand-held condition" to "fixed condition," but not from "fixed condition" to "hand-held condition." Here, t3−t2=T_TRIPD.

(8) At the time when the count value reaches t3 (T=t3), the fixed condition detection calculation is halted, and the hand-held condition detection calculation is initiated. During the time period, T=t3~t4, the hand-held condition detection calculation is executed (9) At the time when the count value reaches t4 (T=t4), the hand-held condition detection calculation is halted, and the fixed condition detection calculation is initiated. Here, t4−t2=T INTRVL. Thereafter, with T_INTRVL being the period, the fixed condition detection calculation and the hand-held condition detection calculation are alternately repeated.

By implementing this sequence, even if, although the camera is actually in a hand-held condition, it is erroneously determined that it is in a fixed condition, the hand-held condition determination can be promptly resumed. Further, even if the camera is panned while fixed on a tripod, the fixed condition determination can be readily resumed because the fixed condition detection operation is repeated periodically.

(10) During the time period, T=t4~t5, the fixed condition detection calculation is executed; at the time when the count value reaches t5 (T=t5), the calculation is halted, and the hand-held condition detection calculation is initiated. Here, t5−t4=T_TRIPD.

(11) At the time when the count value reaches t6 (T=t6), half-press switch SW1 turns to be OFF. At this time point, however, half-press timer 130 is not yet OFF. Also, electromagnetic lock 100 is still being released.

(12) At the time when the count value reaches t7 (T=t7), electromagnetic lock 100 is operated, and blur correction lens 80 is locked. Here, t7−t6=T_LOCK.

(13) At the time when the count value reaches t8 (T=t8), half-press timer 130 turns to be OFF. In synchronization with the half-press timer 130's OFF, the operation of supporting condition determination portion (fixation condition determination portion) 40 ends, and angular velocity sensor 10 also turns to be OFF. During the time period, T=t5~t8, the hand-held condition detection calculation is executed; and "t8−t5<T_INTRVL-T_TRIPD" holds.

As described above, in this embodiment, when detecting the fixation condition of the camera:

(I) The fixed condition detection and the hand-held condition detection are performed alternately and periodically.

(II) For a while just after power was supplied to the angular velocity sensor, the fixed condition determination is held.

As a result, the following effects are obtained:

(i) By holding the fixed condition determination during the time period in which the level of the drift components on the angular sensor's output is largest and thus by not performing the unnecessary blur correction, the image deterioration due to the drift components can be avoided.

(ii) Even if, although the camera is actually in a hand-held condition, it is erroneously determined that it is in a fixed condition, the hand-held condition determination can be promptly resumed.

(iii) Even if the camera is panned while fixed on a tripod, the fixed condition determination can be readily resumed on completion of the panning operation.

(iv) The two effects, (ii) and (iii) above, results effective distinguishing between the hand-held condition and the fixed condition; and thus, there can be provided a blur correction camera which does not irritate the user whether the camera is held with hands or is mounted on a tripod or the like. Further, whether the camera is held with hands or is mounted on a tripod or the like, photographs without image blurring can be thus taken.

(v) In addition, by not simultaneously operating the hand-held condition detection and the fixed condition detection, the required amount of calculation can be decreased.

Without being restricted to the embodiment described above, various kinds of modifications and changes may be applied to the embodiment, and those modifications and changes are within the range of equivalency of the present invention.

For example, in view of the function performed by the blur correction device, the camera in which the device is built is more likely to be used in the hand-held condition. Thus, making the camera system to satisfy a condition, "the time spent for the fixed condition detection< the time spent for the hand-held condition detection," is preferable. This condition can be expressed by using the symbols in FIG. 10 as follows:

$$T\_TRIPD < T\_INTRVL-T\_TRIPD \quad (3),$$

or $$T\_INIT < T\_INTRVL-T\_INIT \quad (4)$$

In the above inequalities, the right side represents the time spent for the hand-held condition detection, and the left side represents the time spent for the fixed condition detection (the time spent for holding the fixed condition).

Because the time spent for the hand-held condition detection (the first time) is thus set to be longer than the time spent for the fixed condition detection (the second time), risk of failure caused by the blur correction function being not activated is reduced.

(Third Embodiment)

Figure 11:
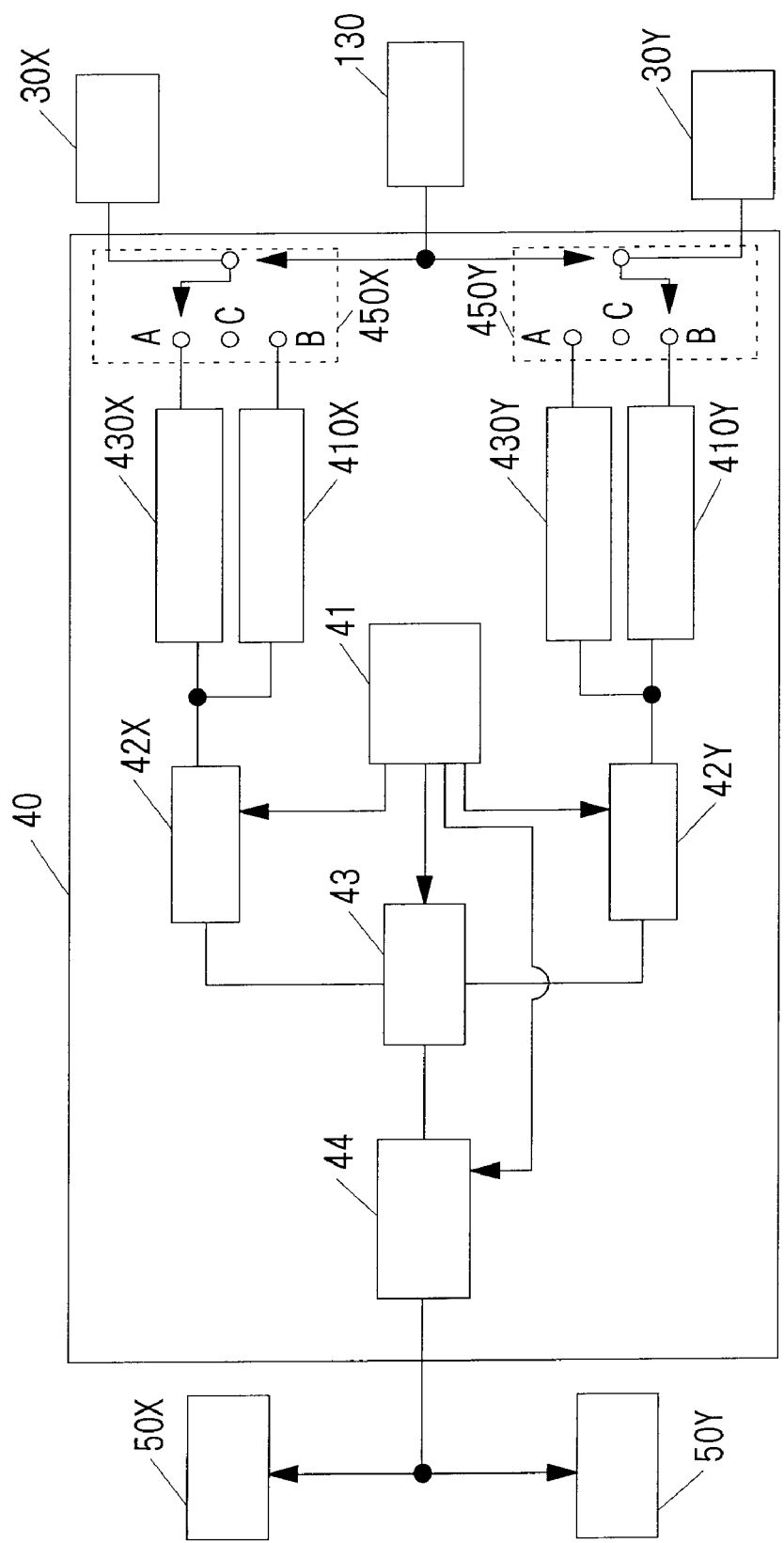
FIG. 11 illustrates in detail an inner configuration of supporting condition determination portion 40 of a blur correction camera of a third embodiment.
Figure 12:
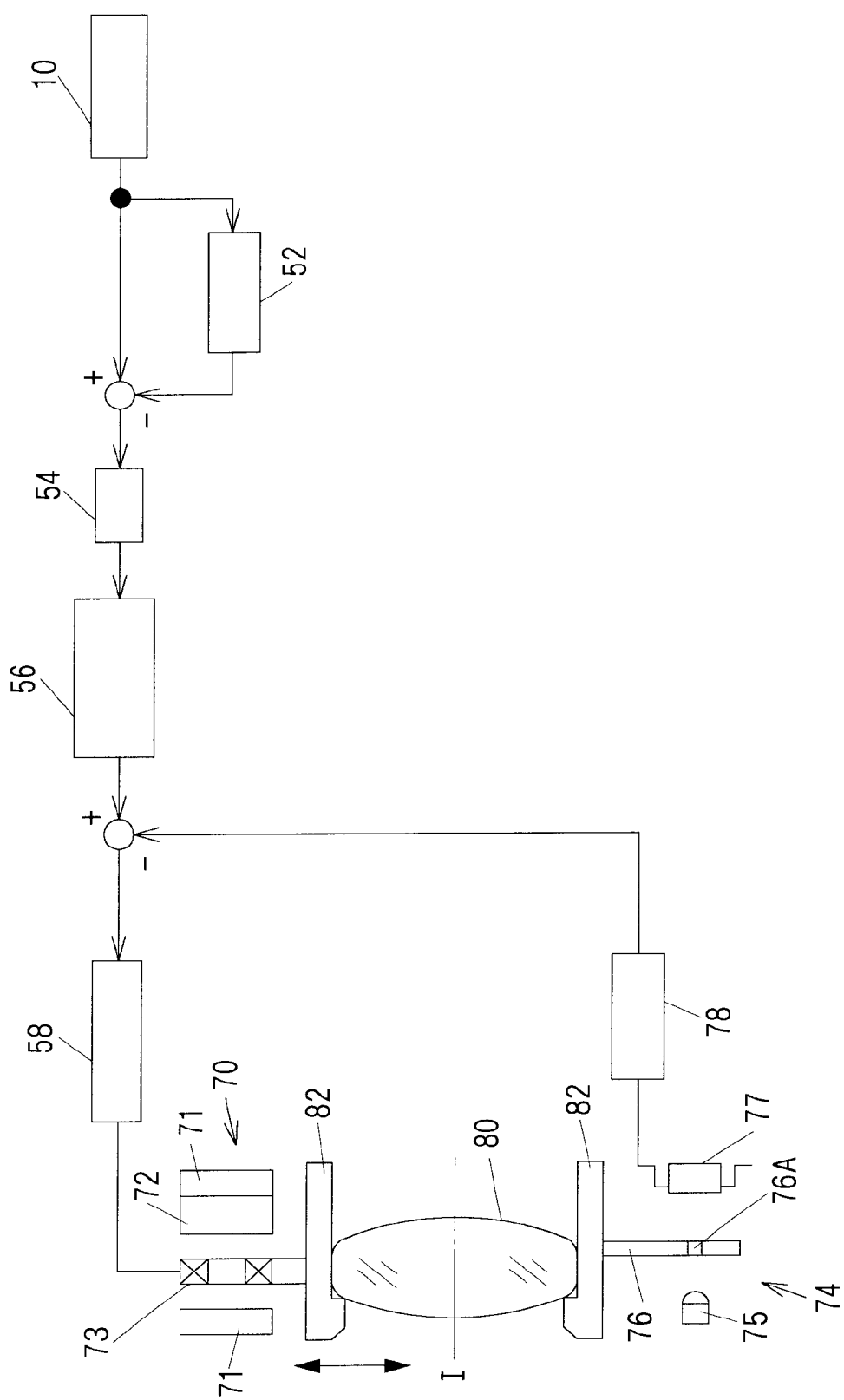
FIG. 12 is a block diagram illustrating a basic configuration of a blur correction device including a conventional shake detection device.

This embodiment has the function of the fixation condition determination portion described in the description of the first embodiment as well as the function of the fixation condition determination portion described in the description of the second embodiment. Because each of the fixation condition determination portions has already been described, this embodiment will be briefly described. FIG. 11 illustrates in detail the inner configuration of fixation condition determination portion of a blur correction camera of this embodiment.

Fixed condition detection portion (stable support condition detection portion) 410 performs calculation for detecting whether the camera is in a fixed condition or not based on a shake detection signal (digital signal) sent from A/D converter 30. This portion performs a "one-way" detection in which transition from a hand-held condition to a fixed condition is detected, but transition from a fixed condition to a hand-held condition is not detected.

Fixed condition detection portion 410 is constituted of detection portion 410X dedicated to the X-axis and detection portion 410Y dedicated to the Y-axis, and they performs the calculation separately. Further, both of fixed condition detection portions 410X and 410Y operate only when the shake detection signal is inputted to them through shake detection signal switching portion 450.

Hand-held condition detection portion (non-stable support condition detection portion) 430 performs calculation for detecting whether the camera is in a hand-held condition or not based on a shake detection signal (digital signal) sent from A/D converter 30. This portion performs a "one-way" detection in which transition from a fixed condition to a hand-held condition is detected, but transition from a hand-held condition to a fixed condition is not detected.

Thus, when hand-held condition detection portion 430 is operated, "fixed condition→hand-held condition" transition is detected, but "hand-held condition→fixed condition" transition is not detected. Also, as described above, when fixed condition detection portion 410 is operated, "hand-held condition→fixed condition" transition is detected, but "fixed condition→hand-held condition" transition is not detected. Accordingly, frequent detection of "hand-held condition" and "fixed condition" due to noise or the like is avoided.

Next, the signal detected by fixed condition detection portion (stable support condition detection portion) 410 or by hand-held condition detection portion (non-stable support condition detection portion) 430 is sent to signal determination portion 42. On the other hand, although omitted in FIG. 11, halt command portion 41, by referring to the operation states of electromagnetic lock controller 110, full-press switch SW2, mirror drive motor 150, film winding motor 180, and shutter mechanism 190, transmits as necessary a halt command on the fixation condition determination operation to signal determination portions 42X and 42Y, logical multiplication portion 43, and determination result holding portion 44, as shown in FIG. 2. The specific determination operation of halt command portion 41 is the same as described in the description of the first embodiment.

This embodiment has the effects of the first embodiment as well as the effects of the second embodiment and provides still another optimum blur detection and correction.

What is claimed is:

1. A shake detection device comprising:
   a vibration detection portion that detects a vibration and outputs a vibration detection signal; and
   a support condition detection portion that includes a stable support condition detection portion which detects based on said vibration detection signal that the supporting condition of a device including said vibration detection portion is a stably supported condition and a non-stable support condition detection portion which, independently of said stable support condition detection portion, detects based on said vibrtion detection signal that the supporting condition of said device is a non-stably supported condition, that determines whether said supporting condition is a stably supported condition or a non-stably supported condition, and that outputs the determination result.

2. A shake detection device according to claim 1, wherein said support condition detection portion alternately performs determination based on the detection result of said stable support condition detection portion and determination based on the detection result of said non-stable support condition detection portion.

3. A shake detection device according to claim 2, wherein said support condition detection portion successively performs said determination based on the detection result of said stable support condition detection portion and said determination based on the detection result of said non-stable support condition detection portion.

4. A shake detection device according to claim 1, wherein said support condition detection portion determines that supporting condition is a stably supported condition when the vibration detection is unstable.

5. A shake detection device according to claim 4, wherein said support condition detection portion determines that the vibration detection is unstable within a predetermined time period which start at the time point when said vibration detection portion begins detecting said vibration.

6. A shake detection device according to claim 1, wherein said non-stable support condition detection portion detects a condition in which said device is supported by the operator of said device as said non-stably supported condition, and said stable support condition detection portion detects a condition in which said device is fixed on a support member as said stably supported condition.

7. A shake detection device according to claim 2, wherein said non-stable support condition detection portion performs the detection of said non-stably supported condition for a predetermined first time, and said stable support condition detection portion performs the detection of said stably supported condition for a predetermined second time shorter than said first time.

8. A shake detection device comprising:
   a vibration detection portion that detects a vibration and outputs a vibration detection signal;
   a fixation condition determination portion that determines the fixation condition of a device including said vibration detection portion and outputs the determination result; and
   a halt command portion that generates a halt command for halting the determination of said fixation condition when said device including said vibration detection portion performs an operation which generates vibration of said device itself.

9. A shake detection device according to claim 8, wherein said fixation condition determination portion stores the determination result of the fixation condition at the time when said halt command portion began generating said halt command and continues to output the stored determination result during the time period in which said halt command portion is generating said halt command.

10. An optical device comprising:
    a shake detection portion that detects a vibration and outputs a vibration detection signal;
    a blur correction optical system that correct blurring due to said vibration;
    a driver that drives said blur correction optical system; and
    a controller that controls said driver based on said vibration detection signal;
    wherein said shake detection portion includes
       a vibration detection portion that detects a vibration and outputs a vibration detection signal; and
       a support condition detection portion that includes a stable support condition detection portion which detects based on said vibration detection signal that the supporting condition of said optical device is a stably supported condition and a non-stable support condition detection portion which, independently of said stable support condition detection portion, detects based on said vibration detection signal that the supporting condition of said optical device is a non-stably supported condition, that determines whether said supporting condition is a stably supported condition or a non-stably supported condition, and that outputs the determination result.

11. An optical device according to claim 10, wherein said support condition detection portion alternately performs determination based on the detection result of said stable support condition detection portion and determination based on the detection result of said non-stable support condition detection portion.

12. An optical device according to claim 11, wherein said support condition detection portion successively performs said determination based on the detection result of said stable support condition detection portion and said determination based on the detection result of said non-stable support condition detection portion.

13. An optical device according to claim 10, wherein said support condition detection portion determines that supporting condition is a stably supported condition when the vibration detection is unstable.

14. An optical device according to claim 13, wherein said support condition detection portion determines that the vibration detection is unstable within a predetermined time period which start at the time point when said vibration detection portion begins detecting said vibration.

15. An optical device according to claim 10, wherein said non-stable support condition detection portion detects a condition in which said optical device is supported by the operator of said optical device as said non-stably supported condition, and said stable support condition detection portion detects a condition in which said optical device is fixed on a support member as said stably supported condition.

16. An optical device according to claim 11, wherein
said non-stable support condition detection portion performs the detection of said non-stably supported condition for a predetermined first time, and said stable support condition detection portion performs the detection of said stably supported condition for a predetermined second time shorter than said first time.

17. An optical device comprising:
a shake detection portion that detects a vibration and outputs a vibration detection signal;
a blur correction optical system that correct blurring due to said vibration;
a driver that drives said blur correction optical system; and
a controller that controls said driver based on said vibration detection signal;
wherein said shake detection portion includes
  a vibration detection portion that detects a vibration and outputs a vibration detection signal;
  a fixation condition determination portion that determines the fixation condition of said optical device including said vibration detection portion and outputs the determination result; and
  a halt command portion that generates a halt command for halting the determination of said fixation condition when said optical device performs an operation which generates vibration of said optical device itself.

18. An optical device according to claim 17, wherein
said fixation condition determination portion stores the determination result of the fixation condition at the time when said halt command portion began generating said halt command and continues to output the stored determination result during the time period in which said halt command portion is generating said halt command.

19. An optical device according to claim 17, wherein
said controller outputs a control signal calculated from said vibration detection signal of said vibration detection portion when said fixation condition determination portion determines that said fixation condition of said optical device is a non-fixed condition and outputs a control signal as a constant value when said fixation condition determination portion determines that said fixation condition of said optical device is a fixed condition.

20. A camera system comprising:
a shake detection portion that detects a vibration and outputs a vibration detection signal;
a blur correction optical system that correct blurring due to said vibration;
a driver that drives said blur correction optical system; and
a controller that controls said driver based on said vibration detection signal;
wherein said shake detection portion includes
  a vibration detection portion that detects a vibration and outputs a vibration detection signal; and
  a support condition detection portion that includes a stable support condition detection portion which detects based on said vibration detection signal that the supporting condition of said camera system is a stably supported condition and a non-stable support condition detection portion which, independently of said stable support condition detection portion, detects based on said vibration detection signal that the supporting condition of said camera system is a non-stably supported condition, that determines whether said supporting condition is a stably supported condition or a non-stably supported condition, and that outputs the determination result.

21. A camera system according to claim 20, wherein
said support condition detection portion alternately performs determination based on the detection result of said stable support condition detection portion and determination based on the detection result of said non-stable support condition detection portion.

22. A camera system according to claim 21, wherein
said support condition detection portion successively performs said determination based on the detection result of said stable support condition detection portion and said determination based on the detection result of said non-stable support condition detection portion.

23. A camera system according to claim 20, wherein
said support condition detection portion determines that supporting condition is a stably supported condition when the vibration detection is unstable.

24. A camera system according to claim 23, wherein
said support condition detection portion determines that the vibration detection is unstable within a predetermined time period which start at the time point when said vibration detection portion begins detecting said vibration.

25. A camera system according to claim 20, wherein
said non-stable support condition detection portion detects a condition in which said camera system device is supported by the operator of said camera system as said non-stably supported condition, and said stable support condition detection portion detects a condition in which said camera system is fixed on a support member as said stably supported condition.

26. A camera system according to claim 21, wherein
said non-stable support condition detection portion performs the detection of said non-stably supported condition for a predetermined first time, and said stable support condition detection portion performs the detection of said stably supported condition for a predetermined second time shorter than said first time.

27. A camera system comprising:
a shake detection portion that detects a vibration and outputs a vibration detection signal;
a blur correction optical system that correct blurring due to said vibration;
a driver that drives said blur correction optical system; and
a controller that controls said driver based on said vibration detection signal;
wherein said shake detection portion includes
  a vibration detection portion that detects a vibration and outputs a vibration detection signal;
  a fixation condition determination portion that determines the fixation condition of said camera system including said vibration detection portion and outputs the determination result; and
  a halt command portion that generates a halt command for halting the determination of said fixation condition when said camera system performs an operation which generates vibration of said camera system itself.

28. A camera system according to claim 27, wherein
said fixation condition determination portion stores the determination result of the fixation condition at the time when said halt command portion began generating said halt command and continues to output the stored determination result during the time period in which said halt command portion is generating said halt command.

29. A camera system according to claim 27, wherein
said controller outputs a control signal calculated from said vibration detection signal of said vibration detection portion when said fixation condition determination portion determines that said fixation condition of said camera system is a non-fixed condition and outputs a control signal as a constant value when said fixation condition determination portion determines that said fixation condition of said camera system is a fixed condition.

30. A camera system according to claim 27, wherein
said blur correction optical system constitutes at least a part of an optical system which images a subject image on a recording portion, and said halt command portion continues to generate said halt command while said subject image is being shot.

31. A camera system according to claim 27, wherein
said camera system is provided with at least one mechanism from among a film winding mechanism which winds a film for recording a subject image imaged via said blur correction optical system, a shutter mechanism which controls the light amount of the imaged subject image, a lock mechanism for locking said blur correction optical system, and a mirror drive mechanism which drives a mirror for reflecting light passed through said blur correction optical system; and
said halt command portion generates said halt command when at least one of the mechanisms is operating.

32. An interchangeable lens comprising:
a shake detection portion that detects a vibration and outputs a vibration detection signal;
a blur correction optical system that correct blurring due to said vibration;
a driver that drives said blur correction optical system; and
a controller that controls said driver based on said vibration detection signal;
wherein said shake detection portion includes
a vibration detection portion that detects a vibration and outputs a vibration detection signal; and
a support condition detection portion that includes a stable support condition detection portion which detects based on said vibration detection signal that the supporting condition of said interchangeable lens is a stably supported condition and a non-stable support condition detection portion which, independently of said stable support condition detection portion, detects based on said vibration detection signal that the supporting condition of said interchangeable lens is a non-stably supported condition, that determines whether said supporting condition is a stably supported condition or a non-stably supported condition, and that outputs the determination result.

33. An interchangeable lens according to claim 32, wherein
said support condition detection portion alternately performs determination based on the detection result of said stable support condition detection portion and determination based on the detection result of said non-stable support condition detection portion.

34. An interchangeable lens according to claim 33, wherein
said support condition detection portion successively performs said determination based on the detection result of said stable support condition detection portion and said determination based on the detection result of said non-stable support condition detection portion.

35. An interchangeable lens according to claim 32, wherein
said support condition detection portion determines that supporting condition is a stably supported condition when the vibration detection is unstable.

36. An interchangeable lens according to claim 32, wherein
said support condition detection portion determines that the vibration detection is unstable within a predetermined time period which start at the time point when said vibration detection portion begins detecting said vibration.

37. An interchangeable lens according to claim 32, wherein
said non-stable support condition detection portion detects a condition in which said interchangeable lens is supported by the operator of said interchangeable lens as said non-stably supported condition, and said stable support condition detection portion detects a condition in which said interchangeable lens is fixed on a support member as said stably supported condition.

38. An interchangeable lens according to claim 33, wherein
said non-stable support condition detection portion performs the detection of said non-stably supported condition for a predetermined first time, and said stable support condition detection portion performs the detection of said stably supported condition for a predetermined second time shorter than said first time.

39. An interchangeable lens comprising:
a shake detection portion that detects a vibration and outputs a vibration detection signal;
a blur correction optical system that correct blurring due to said vibration;
a driver that drives said blur correction optical system; and
a controller that controls said driver based on said vibration detection signal;
wherein said shake detection portion includes
a vibration detection portion that detects a vibration and outputs a vibration detection signal;
a fixation condition determination portion that determines the fixation condition of said interchangeable lens including said vibration detection portion and outputs the determination result; and
a halt command portion that generates a halt command for halting the determination of said fixation condition when said interchangeable lens performs an operation which generates vibration of said interchangeable lens itself.

40. An interchangeable lens according to claim 39, wherein
said fixation condition determination portion stores the determination result of the fixation condition at the time when said halt command portion began generating said halt command and continues to output the stored determination result during the time period in which said halt command portion is generating said halt command.

41. An interchangeable lens according to claim 39, wherein said controller outputs a control signal calculated from said vibration detection signal of said vibration detection portion when said fixation condition determination portion determines that said fixation condition of said camera system is a non-fixed condition and outputs a control signal as a constant value when said fixation condition determination portion determines that said fixation condition of said camera system is a fixed condition.

42. An interchangeable lens according to claim 39, wherein said blur correction optical system constitutes at least a part of an optical system which images a subject image on a recording portion, and said halt command portion continues to generate said halt command while said subject image is being shot.

43. An interchangeable lens according to claim 39, wherein said interchangeable lens is attachable to a camera body;

said camera body is provided with at least one mechanism from among a film winding mechanism which winds a film for recording a subject image imaged via said blur correction optical system, a shutter mechanism which controls the light amount of the imaged subject image, a lock mechanism for locking said blur correction optical system, and a mirror drive mechanism which drives a mirror for reflecting light passed through said blur correction optical system; and said halt command portion generates said halt command when at least one of the mechanisms is operating.

\* \* \* \* \*

UNITED STATES PATENT AND TRADEMARK OFFICE
CERTIFICATE OF CORRECTION

PATENT NO. : 6,614,994 B2
DATED : September 2, 2003
INVENTOR(S) : Sueyuki Ohishi et al.

It is certified that error appears in the above-identified patent and that said Letters Patent is hereby corrected as shown below:

<u>Column 25,</u>
Line 18, change "vibrtion" to -- vibration --.

Signed and Sealed this

Thirtieth Day of December, 2003

JAMES E. ROGAN
*Director of the United States Patent and Trademark Office*